United States Patent [19]

Impink, Jr.

[11] Patent Number: 4,637,910
[45] Date of Patent: Jan. 20, 1987

[54] METHOD AND APPARATUS FOR CONTINUOUS ON-LINE SYNTHESIS OF POWER DISTRIBUTION IN A NUCLEAR REACTOR CORE

[75] Inventor: Albert J. Impink, Jr., Murrysville, Pa.

[73] Assignee: Westinghouse Electric Corp., Pittsburgh, Pa.

[21] Appl. No.: 572,499

[22] Filed: Jan. 20, 1984

[51] Int. Cl.$^4$ .............................................. G21C 7/36
[52] U.S. Cl. .................... 376/216; 376/215; 376/217
[58] Field of Search ..................... 376/216, 217, 215

[56] References Cited

U.S. PATENT DOCUMENTS

| | | | |
|---|---|---|---|
| 4,066,497 | 1/1978 | Sato | 376/217 |
| 4,075,059 | 2/1978 | Bruno | 376/217 |
| 4,318,778 | 3/1982 | Musick | 376/216 |
| 4,432,930 | 2/1984 | Impink | 376/217 |

Primary Examiner—Donald P. Walsh
Attorney, Agent, or Firm—Daniel C. Abeles

[57] ABSTRACT

On-line, real time monitoring of core-wide and local power in an advanced pressurized water reactor is provided by a system having four channel sets of fixed incore nuclear detector strings distributed in fuel assemblies across the core in a pattern which produces a uniquely identifiable detector response to rod movement even with one channel set out of service. Separate signal processors for each channel generate totally independent core-wide overpower protection signals and exchange detector responses through fiber optic data links for local power monitoring. The local power density at each detector level for any desired point across the core is determined by fitting a surface spline function to the detector responses adjusted to eliminate the local effects of rod movement from a reference condition, interpolation of the fitting function, and factoring back in the local effects of rod movement. If local power in the X-Y plane approaches but does not exceed trip criteria, a pointwise axial power distribution is generated to determine if a local overpower condition exists between detector levels. Misalignment of rods from the positions indicated by the position indicators is detected by a pattern recognition procedure for finding a fit between the effects of successive assumptions of misaligned rods and the detector responses adjusted for known rod movement.

28 Claims, 24 Drawing Figures

METHOD AND APPARATUS FOR CONTINUOUS ON-LINE SYNTHESIS OF POWER DISTRIBUTION IN A NUCLEAR REACTOR CORE

BACKGROUND OF THE INVENTION

1. Field of the Invention

This invention is directed to a system for detecting and initiating response, as required, to nuclear overpower conditions in reactor cores and for providing information useful for reactor control and surveillance purposes by using a minimum number of incore nuclear detectors grouped in redundant sets together with the required hardware and software for signal and data processing to continuously monitor and evaluate nuclear power level and nuclear power spatial distribution in the reactor core.

2. Prior Art

The fissionable material in a nuclear reactor is housed in pellet form in long metallic fuel rods which are mounted in spaced, parallel relationship in square frames to form elongated fuel assemblies containing for instance, two to three hundred rods. Typically, between one hundred and two hundred of these square, elongated fuel assemblies are massed together inside a reactor vessel to form a generally cylindrical reactor core in which the density of the neutrons produced by the fission reactions in the fuel pellets in successive generations is sufficient to sustain a chain reaction. The thermal energy produced by the chain reaction is absorbed by a reactor coolant, which circulates through the core, and is utilized externally to generate electric power in a turbine generator set.

In order to maintain the power of the reactor core at a given level, the neutron population must be controlled so that it remains constant in each successive generation. Excess neutrons produced by fission are removed from the fission process by introducing neutron absorbing materials into the core. Long term control of the reactivity in a pressurized water reactor (PWR) is achieved by disolving boron, a neutron absorber, in the reactor coolant. Short term control is effected by control rods containing neutron absorbant material which are inserted vertically into guide tubes or thimbles distributed across the fuel assemblies. A number of control rods, referred to as rodlets, are connected together at their remote ends by spiders to form control rod clusters which can be inserted into and withdrawn from the core simultaneously by a common drive mechanism.

Control of the reactivity of a reactor is complicated by the generation of xenon 135 which has a high cross-section of neutron absorption and therefore poisons the core. While some xenon is generated directly by fission, most of it is produced by decay of fission products and therefore, xenon production lags an increase in reactivity. Since some of the xenon is consumed directly by neutron absorption as well as by decay, a reduction in reactivity with the attendant reduction in neutron flux results in a large increase in xenon concentration. The localized effects on reactivity produced by the control rods affect the distribution of xenon, and therefore the ability to generate power in the near future, throughout the core.

Advanced PWR cores have two additional types of rods which are vertically inserted into and withdrawn from the reactor core. In any thermal fission reactor, the energy level of the neutrons produced by fission is generally too high to produce any significant fission reactions. However, the reactor coolant, ordinary water in the case of a PWR, in addition to serving as a heat transfer medium, also acts as a moderator which slows the fast neutrons down to a more suitable velocity for fission. The higher energy neutrons, however, are capable of transforming uranium 238 in the fuel into plutonium 239 which, in turn, can be used as a fission fuel. The conventional PWR does not utilize this phenomenon efficiently, but rather uses neutron absorbing material to absorb excess neutrons. Since excess reactivity is designed into the conventional PWR so that rated power may be maintained for a longer period of time as the core burns up, this results in an inefficient use of the nuclear fuel through high rates of absorption of neutrons early in the fuel cycle. The advanced PWR, on the other hand, utilizes the higher energy neutrons to produce plutonium which becomes available later in the fuel cycle for producing power. This is acheived by the use of water displacer rods made of neutron transparent material which are inserted into the core early in the fuel cycle. These rods, by displacing the moderator without absorbing neutrons, effect a spectral shift to higher energy neutrons which results in higher rates of production of plutonium. In addition to the control rods and water displacer rods, the advanced PWR also has gray rods which are between the control rods and water displacer rods in neutron absorption capacity. These gray rods are used in control of the neutron population and, like the water displacer rods, are either fully inserted or fully withdrawn. Like the control rods, the water displacer rods and gray rods are mounted on spiders to form rod clusters which are operated simultaneously with clusters symmetrically located in each quadrant of the core to avoid radial distortion of the power distribution.

In any nuclear reactor, it is important to monitor both the total power generated in the core and the spatial distribution of the power. Local hot spots can fault the fuel rod cladding, releasing fission products into the reactor coolant and thus compromising the first barrier for containment of the fissionable material. Local hot spots could result from improper sequencing of the rod clusters such as through failure of a drive mechanism. It could also arise from disengagement of a rod from a cluster. While an unplanned insertion of a control rod reduces the local reactivity, the control system, in an attempt to maintain a commanded total power, will increase the power in other parts of the core to a level which may approach design limits.

Many of the current systems for monitoring reactor power utilize detectors outside of the reactor vessel (excore detectors) to determine the total power as a function of the leakage flux. Certain assumptions are made from the individual readings on the excore detectors as to the spatial distribution of power within the core. In view of this, substantial margins must be built into the control system to assure that operating limits are not exceeded. It is also not always possible with such a detection system to determine the specific rod or rod cluster which is the source of such trouble.

It is common in commercial reactors to periodically insert movable neutron detectors into thimbles in the reactor core to map the neutron flux density. The movable incore detectors have also been used to calibrate the excore detector system. However, these are not protection grade and, for the most part, are only used periodically.

It is also common to group the detectors in independant channel sets to provide redundancy for the reactor protection system. Typically, an overpower indication on two out of four of the channel sets, or on two out of three or one out of two, if one or two channel sets respectively are out of service, initiates a reactor trip.

Some reactor power detection systems have used fixed incore detectors. In the system described in U.S. Pat. No. 3,565,760, the reactor core is divided into four quadrants so that an incore detector located at a given position in one quadrant provides a signal that is expected to be representative of the corresponding positions in all four quadrants. Detectors are positioned in a different radial and/or angular position in each quadrant so that each detector is in a unique position with respect to the symmetry of the core, and a sufficient number of the detectors is provided to furnish complete representative monitoring of the core. The detector outputs are each compared with a limit value to determine an overpower condition adjacent the detector; however, if a local hot spot exists in the symmetrical location where there is no detector it will go undetected. The outputs from the detectors are also grouped into several average power circuits with each group having detectors from representative locations across the core so that there are several independent signals representative of the core total power. The individual detector overpower signals and the total power signals are used in a plant protection system which trips the reactor if preset operating limits are exceeded.

The present state of the art leaves unfulfilled a need for an accurate, reliable on-line system for generating signals representative of the total power generated by a reactor core and the spatial distribution of that power. In particular, there is no available system which can accurately indicate a specific control rod cluster or water displacer rod cluster which is out of position by use of fixed incore detector strings in less than half the fuel assemblies especially with one or more groups of detectors out of service. The prior art systems also are not capable of pinpointing the location of a hot spot in the core down to a specific fuel rod location.

SUMMARY OF THE INVENTION

The present invention provides an on-line, real time capability of determining the local power density at any desired point within the core of a nuclear reactor at any desired resolution, whether individual fuel rod or fuel assembly. It also provides the capability of determining the misalignment of any rod member from the position indicated by the conventional position indicator system. The term rod member encompasses conventional control rods as well as the water displacer and gray rods found in an advanced pressurized water reactor. The invention also provides redundant core-wide and local overpower partial trip signals for a multichannel plant protection system and operator alarm signals for a surveillance system. The power signals generated can also be used for the reactor control system.

According to the invention, strings of fixed incore nuclear detectors are arranged in channel sets and distributed in fuel assemblies across the core in a pattern such that movement of any of the rod members produces a uniquely identifiable response in nearby detectors even with one channel set out of service. In the case of water displacer rod clusters, four channels of detector strings can be arranged so that misalignment of any of the WDRCs can be detected even with two of the four channel sets out of service.

A separate signal processor is provided for each channel set of detector signals. Each signal processor generates an independent core-wide power signal using only the detector signals from its own channel set. However, fiber optic data links transmit the signals associated with each signal processor to each of the other signal processors for use in monitoring local power density and misalignment of rod members.

Each signal processor generates its own set of reference signals representing the power at all points of interest in the core such as at all fuel assemblies and known locations of likely hot spots. In determining if any rod clusters are misaligned, the actual detector responses are adjusted to eliminate the local effects of all known rod movement since the reference was established. A pattern recognition scheme is then used to search for possible misaligned rod clusters. This involves successively assuming that selected rod clusters are misaligned, obtaining a least squares fit of the fractional effect such a misalignment would have on the responses of nearby detectors to the actual fractional deviations between the actual detector responses and the reference values, and evaluating the mean square errors. The best fit is indicated by the minimum mean square error and if this error is above a threshold value, the associated rod cluster is in fact misaligned.

In generating the local power densities, the local effects produced by any misaligned rods are also eliminated from the deviations of the detector signals from the reference values so that a fitting function, such as a surface spline function, can be made to the adjusted deviations. The value of the fitting function at any of the desired points can then be determined by interpolation and the absolute power can be calculated by multiplying the reference power for this point by one plus the fractional value of the fitting function value at that point and a factor which takes into account the local effects of rod movement which were previously eliminated to obtain a smooth fitting function. This procedure is carried out for each level of the detectors in the detectors strings. If any of the local power signals exceed trip criteria, a reactor trip signal is generated. If the local power in any of these X-Y planes approaches, but does not exceed, the trip criteria, a pointwise axial distribution of power at this point is generated to determine if the local power exceeds trip criteria at any point intermediate the detector levels. This is accomplished by generating a fitting function fit to the local powers at the indicated X-Y point at each detector level and then locating the peak value of the fitting function.

The present invention by providing accurate, reliable real time monitoring of local power in a nuclear reactor permits operation with smaller margins of uncertainty. It also provides the capability of pinpointing hot spots and identifying misaligned rods.

DESCRIPTION OF THE PREFERRED EMBODIMENT

Figure 1:
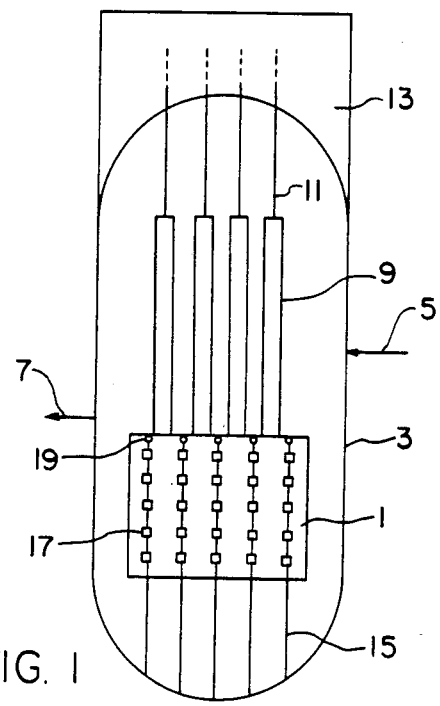
FIG. 1 is a schematic diagram of a nuclear reactor to which the present invention has been applied.

The present invention will be described as applied to an advanced pressurized water reactor (APWR) electric power generating unit but it has application also to other types of nuclear reactor systems. As shown schematically in FIG. 1, the reactor includes a core 1 mounted in a pressurized reactor vessel 3. Reactor coolant is introduced into the reactor vessel 3 at 5, circulates through the reactor core 1, and exits the vessel at 7. As explained above, the reactivity of the advanced pressurized water reactor is controlled by three types of rods, conventional control rods, water displacer rods and gray rods shown collectively by the reference character 9 in FIG. 1, which are inserted into and withdrawn from the reactor core 1 vertically from above. The various types of rods are mounted in clusters suspended from drive rods 11 which are raised and lowered by rod control systems 13 which are well-known in the art. Rod position indicators (not shown) which are well-known in the art, detect the axial position of the drive rod which is used as an indication of the extent of insertion of the rods in the cluster into the core. At a number of selected locations in the core 1, tubes known as instrumentation thimbles 15 extend vertically through the core and down through the bottom of the pressure vessel 3. Movable incore flux detectors can be periodically inserted in these tubes 15, as is known in the prior art. Also mounted in these tubes 15 are strings of fixed incore detectors 17. The fixed incore detectors 17 can be externally-powered fission chambers, self-powered platinum gamma ray detectors or self-powered rhodium or vanadium neutron detectors, although the self-powered platinum gamma ray detectors are preferred. Each string of fixed incore detectors 17 contains several detectors, five in the embodiment described, with corresponding detectors in each string located in common horizontal planes. Thermocouples 19 also mounted in the instrumentation thimbles 15 measure the core exit temperature. Although in the schematic representation of FIG. 1 the detectors and thermocouples appear larger in diameter than the instrumentation thimbles 15, in reality there is room for the movable detectors to pass freely through the reactor core in the tubes 15.

Figure 2:
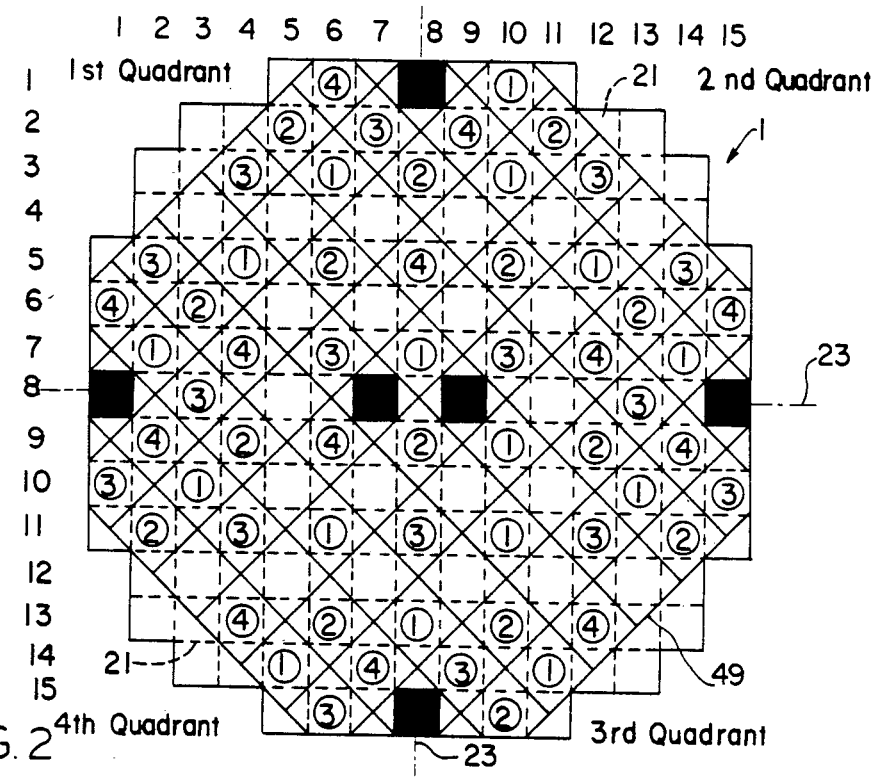
FIG. 2 is a schematic plan view of the core of the nuclear reactor of FIG. 1 adapted in accordance with the teachings of one embodiment of this invention.
Figure 3:
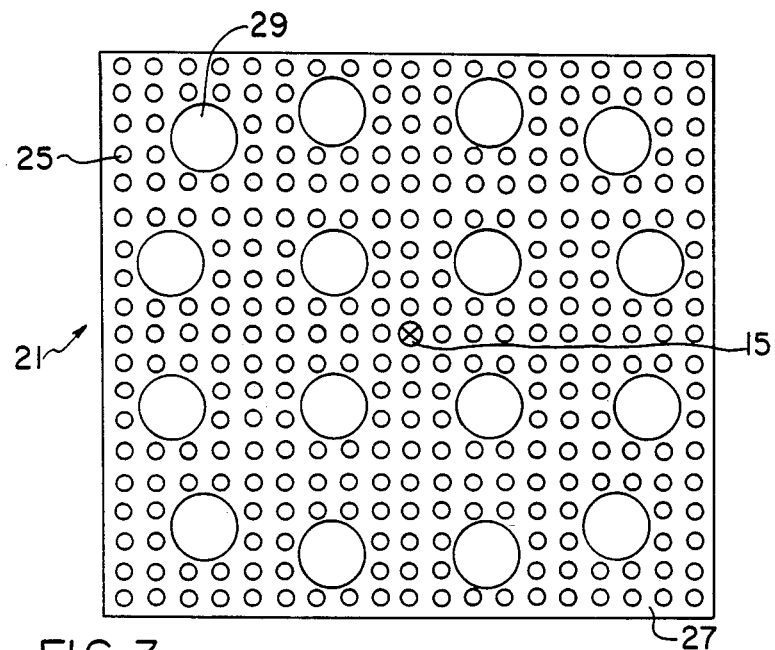
FIG. 3 is an enlarged schematic plan view of one of the fuel assemblies of the reactor core illustrated in FIG. 2.

The reactor core 1 is made up of a number of square fuel assemblies 21, shown in dashed lines in the plan view of FIG. 2, which are massed to form a generally cylindrical structure which is symmetrical in the four quadrants defined by the orthogonal axes 23. In the advanced PWR described, there are 193 of these fuel assemblies. As shown in FIG. 3, each fuel assembly comprises a large number of fuel rods 25 which are long tubes containing pellets of the fissionable fuel. The fuel rods 25 are held in spaced relation by axially spaced structural grids shown schematically at 27 in a manner well-known in the art so that reactor coolant circulating axially through the fuel assembly contacts the entire outer surface of each rod. Spaced throughout the fuel assembly are a number of guide tubes 29 in which the control rods, water displacer rods or gray rods are received. The fuel assembly shown has a 19 by 19 array of fuel rods 25 with 16 guide tubes 29, each of which replaces 4 fuel rods. The fuel rod at the center of the assembly is replaced by the instrumentation thimble 15. Reactor coolant can pass through the guide tubes 29 not occupied by a rod, but not through the instrumentation thimble 15.

Figure 4:
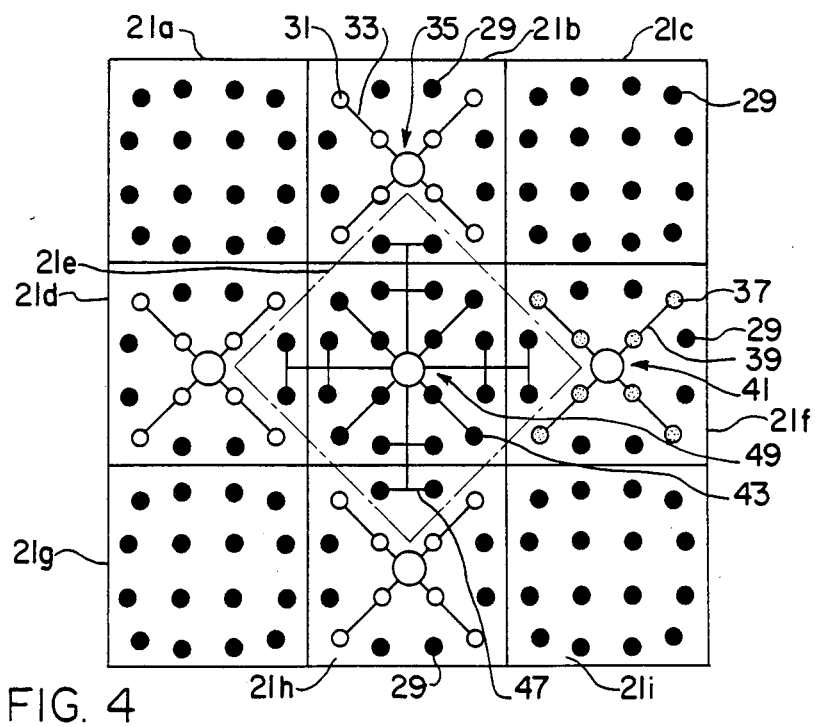
FIG. 4 is a schematic view of a section of the core of FIG. 2 illustrating the arrangement of the rods in the various types of rod clusters.

FIG. 4 illustrates the arrangement of the various rods in a portion of the reactor core 1. The control rods 31 (shown by open circles) are inserted in only the diagonal guide tubes 29 of a fuel assembly with the eight rods of neutron absorbing material joined to a spider 33 to form a control rod cluster 35. Likewise, eight gray rods 37 (shown by dappled circles) are mounted on a spider 39 to form a cluster 41 which is inserted in the diagonal guide tubes 29 of a single fuel assembly 21. The water displacer rods 43 (shown by solid circles) are inserted in each of the 16 guide tubes 29 of a fuel assembly 21 and are joined by a spider 47 with similar rods inserted in two guide tubes in the facing sides of the four orthogonally adjacent fuel cells to form a water displacer rod cluster (WDRC) 49. While other reactors may have a different number of guide tubes and therefore a different number of control rods, gray rods and water displacer rods associated with each fuel cell, the control rods and gray rods will generally be arranged on the diagonals and the clustered water displacer rods will be associated with all of the guide tubes in a fuel assembly and will extend into the adjacent fuel assemblies as shown. Also generally, the control rod clusters 35 and gray rod clusters 41 will be distributed in a checkerboard fashion throughout the core with the placement of a control rod or gray rod cluster at a particular location dependent upon the physics of the core. The water displacer rod clusters 49 are then centered on the complimentary fuel assemblies in the checkerboard pattern. Thus, WDRCs would also be centered on fuel assemblies 21a, 21c, 21g and 21i in FIG. 4 but have not been shown for the sake of clarity. It can be seen from this Figure, however, that the water displacer rod clusters 49 define a square figure shown in the chained line which is larger on a side than the fuel assemblies and is rotated 45° with respect thereto. Thus, the WDRCs distributed in checkerboard fashion across the core define the pattern of squares 49 illustrated in FIG. 2.

As previously discussed, movement of each of the types of rods in one portion of the core is matched by corresponding movement of similar rods in a symmetrical portion of the core to maintain a uniform X-Y distribution of power. Thus, with quadrant symmetry, rod clusters in corresponding locations in the four quadrants are grouped together and operated simultaneously.

Figures 5, 6:
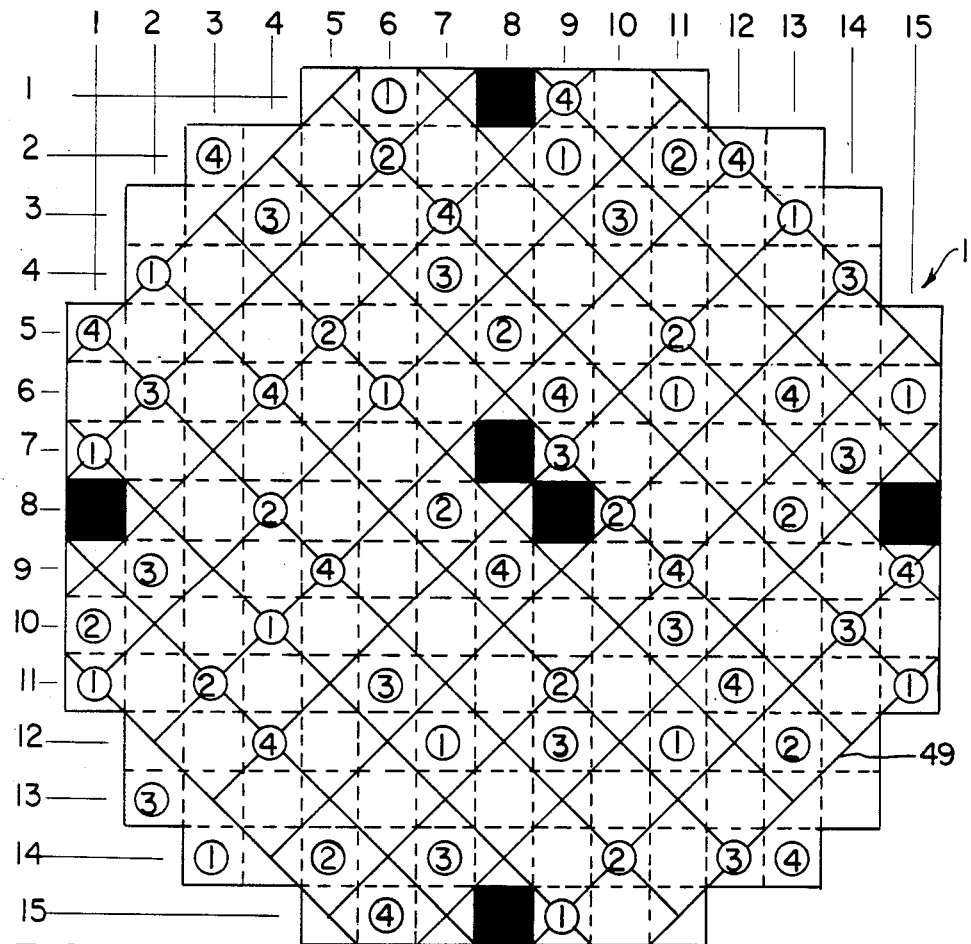
FIG. 5 is a schematic plan view of the core of the nuclear reactor of FIG. 1 adapted in accordance with another embodiment of the invention.
FIG. 6 is a figure of merit used to evaluate the core arrangements illustrated in FIGS. 2 and 5.

Two alternative arrangements of strings of the fixed incore detectors 17 in instrumentation thimbles 15 in a 193 fuel assembly advanced pressurized water reactor and the corresponding systematic distrubition of the respective strings in each arrangement among four protection sets in an integrated protection system are shown in FIGS. 2 and 5. The darkened squares represent fuel assemblies in which the instrumentation thimbles are not available for incore detector strings for mechanical reasons. The circles indicate the fuel assembly locations in which the string of detectors 17 are installed and the numeral within the circle indicates the protection set to which each particular detector string is assigned.

The applications for which the two arrangements of detector strings shown in FIGS. 2 and 5 are intended, and the associated patterns of assignment among the four protection sets, differ in at least one essential respect. The pattern of distribution of the 60 detector strings in the arrangement of FIG. 2 is intended to provide the capability of determining at any time:

1. whether any axial misalignment that could be significant in terms of nuclear reactor safety exists among the water displacer rod clusters in any of the WDRC groups in the APWR core;
2. which of the WDRCs in the core is actually out of position, if an axial misalignment situation is detected; and
3. what is the value of the maximum local nuclear power density in the reactor core and where in the core does that maximum local nuclear power occur as a consequence of the misalignment; with at least two of the four protection sets in service at that time. It is to be noted that the arrangement of the 60 detector strings in FIG. 2 is not particularly well suited for routine on-line surveillance of the core power distribution since many of the fuel locations in the core cannot be monitored either directly (i.e. using a detector string installed in the location) or indirectly (i.e. using a detector string installed in another location that is symmetric in respect to the location of interest) even under conditions of operation in which all protection sets are in service.

The pattern of distribution of the 61 detector strings among the 193 fuel assembly locations shown in FIG. 5 provides a near optimal sensor arrangement for continuous, on-line surveillance of the core power distribution. With the assignment of the various detector response signals (by strings) among the four protection sets as indicated in FIG. 5 this arrangement also provides the same capability of detecting misalignment among water displacer rod clusters and evaluating the consequences of the misalignment as is obtained with the arrangement of FIG. 2 and extends that capability to encompass misalignment of the conventional rod cluster control assemblies as well, provided at least three of the four protection sets remain in service at all times.

The expressed confidence that the respective detector string arrangements provide the stated capability under the specified states of system degradation derives from the following technical considerations. It has been verified by tests conducted within an operating nuclear power reactor, and with computer simulations of other reactors, that synthesis of nuclear power distribution representations and identification of component misalignments can be accomplished using the response signals from incore nuclear detectors provided the spatial density of the available data from the sensors exceeds a specifiable minimum level. A convenient quantitative means of expressing this minimum data density requirement involves the use of a so called "local figure of merit" applied to the X-Y pattern of the functioning sensors. Computation of the local figure of merit for the available sensors in the vicinity of any given fuel assembly location in a reactor core requires only the summing of the worth factors associated with the respective active sensor locations within an array of, for example, 5×5 fuel assembly locations centered on the fuel assembly location of interest. The relative values of the worth factors are set by the distances of the possible sensor locations from the geometric center of the 5×5 array. Specifically, in a typical pressurized water reactor application, the center position in the array is assigned an arbitrary value, and the four possible sensor locations in the four fuel assembly locations orthogonally adjacent to the center fuel assembly location are each assigned worth factors of one-half that of the center location. Then, the other sensor locations in the 5×5 array are given worth factors that decrease with respect to the value in the orthogonally adjacent locations in proportion to the inverse squares of the respective distances. Thus, if the worth factor in the center location of the 5×5 array is assigned a value of 1, the values in the other locations are as shown in FIG. 6, and, for example a set of local functioning sensors having the relative locations shown by the circles in FIG. 6 would have a "local figure of merit" value of:

$$1/16 + \tfrac{1}{8} + 1/10 + \tfrac{1}{2} + \tfrac{1}{4} + 1/10 = 1.1375$$

with respect to the fuel assembly location at the center of the superimposed array.

It should be noted that other forms of the "local figure of merit" function can be formulated and used. It is required, however, that the relations among the several worth factors are consistent with the basic physics of neutron propagation in a power reactor core during power operation.

For the particular formulation of the "local figure of merit" presented here, it has been demonstrated that the minimum value at which reliable identification of component misalignment and evaluation of local nuclear power densities can be accomplished is approximately 0.33. For values in excess of about 0.5, and with the use of appropriate pattern recognition algorithms, success in identification and evaluation can virtually be guaranteed. Analysis of the arrangement of FIG. 2 shows that at all water displacer rod cluster locations, and with all possible combinations of only two protection sets in service, the value of the "local figure of merit" exceeds 0.33 with the exceptions only of values of 0.25 at two peripheral locations with one combination of two protection sets in service. No other arrangement of no more than 61 strings of detectors which is subject to the mechanical constraints imposed in the current Advanced Pressurized Water Reactor design has been identified that comes as close as the arrangement of FIG. 2 in meeting the minimum local data density criterion.

A similar analysis of the arrangement of FIG. 5 reveals that at all possible fuel assembly locations in the core, and with all combinations of at least three protection sets in service, the value of the "local figure of merit" never falls below 0.35 and is at least 0.45 except in one peripheral location for each of two combinations of three protection sets in service. The FIG. 5 arrangement also provides the most nearly uniform distribution of local data densities that has been obtained thus far when all protection sets are in service, granted 61 strings of detectors and the existing mechanical constraints of the advanced pressurized water reactor reactor design.

While the invention is not limited to 60 or 61 strings of detectors for a 193 fuel assembly core, the objectives are to minimize the number of detector strings required to detect the appropriate misalignments and to be able to do so under selected levels of degradation of the detector system. Since it is the present practice in some PWRs to have four drives each controlling 16 movable detectors in instrumentation thimbles 15 dispersed throughout the core with one common thimble for calibration purposes, making 61 instrumented instrumentation thimbles, this offered a logical starting point and proved to provide uniquely identifiable patterns of response even with one or two channel sets out of service as indicated. In the previous arrangements of the accessed instrumentation thimbles, the detectors were used for mapping of the core and were not grouped into protection sets, hence their distribution throughout the core was not intended to, and did not meet the criteria set out above. In the present invention, the movable incore detectors are used only for calibrating the fixed incore detectors. Procedures and methods for calibration of fixed incore detectors on the basis of information derived from movable detector scans in nearby or common core locations are well-known.

The axial arrangement of the fixed incore neutron or gamma ray detectors 17 in each string should be such that each detector is centered between two fuel assembly structural grids 27 to minimize contamination of the detector response signals by grid-induced local neutron or gamma ray absorption or attenuation effects. Depending on the fuel assembly grid spacings, the detectors should be placed among the grids such that the detector string geometry either is axially symmetric with respect to the fuel column or favors slightly the top half of the core to provide improved precision for departure from nucleate boiling ratio (DNBR) evaluation. The elevations of the respective detectors in the 61 strings with respect to a common datum must be essentially the same among all strings. The thermocouples 19, if installed in the combination thimbles, should all be at a common elevation, preferable above the top of the fuel column.

The use of fewer than four neutron or gamma ray detectors 17 per string can be expected to result in significant degradation in precision in the synthesized axial power shapes compared to the degree of precision attainable in X-Y synthesis with all 61 strings of detectors. The use of more than four detectors per string is expected to yield synthesized axial power shapes of precision comparable to that of the synthesized X-Y power shapes and provides at least minimum backup against failure of one detector in any given string. The response signal from each of the detectors in each string retains its identity until axial power shapes are synthesized in the protection channels.

Figure 7:
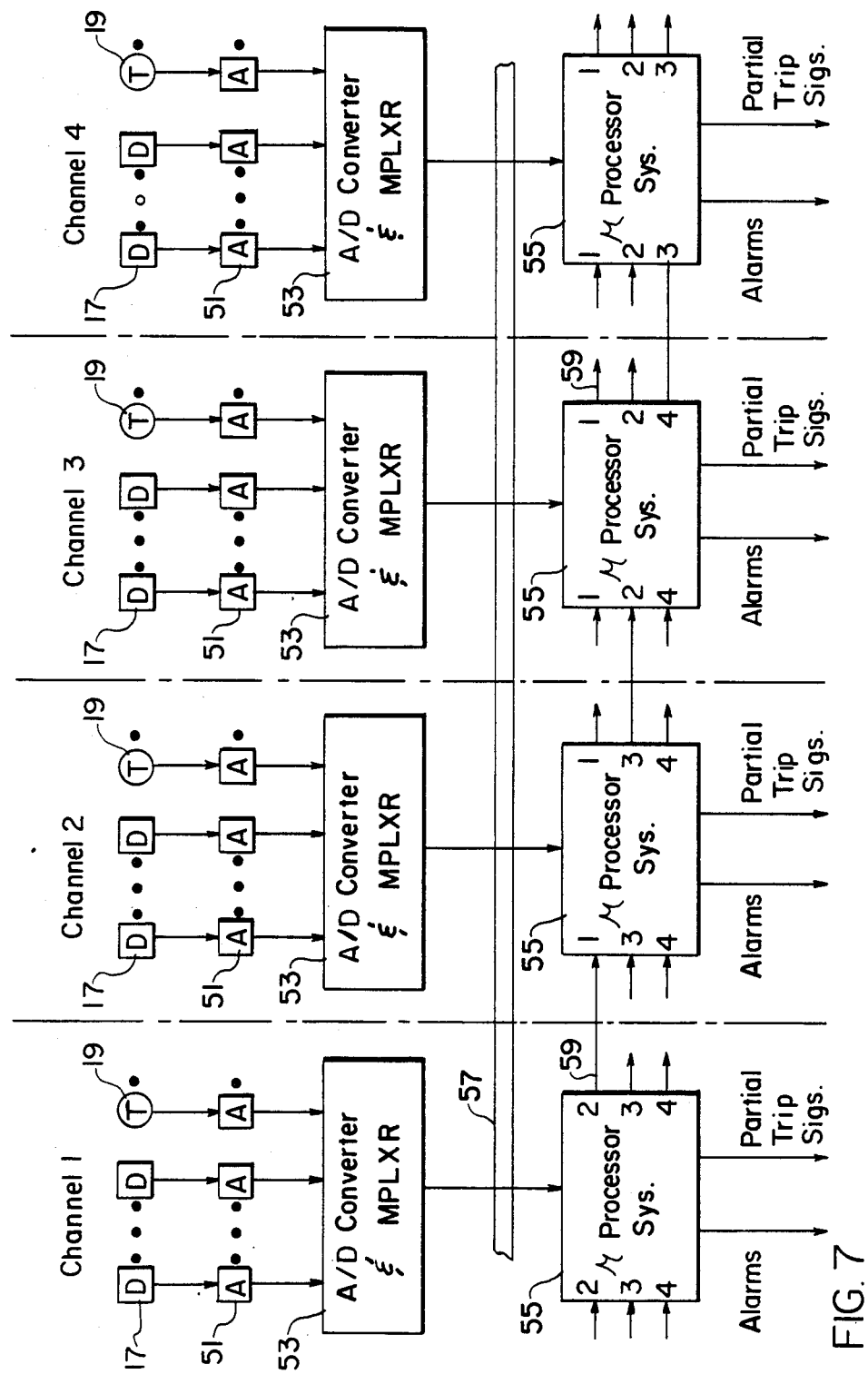
FIG. 7 is a schematic view of the system of this invention for on-line synthesis of the power distribution in the nuclear reactor of FIG. 1.

FIG. 7 illustrates schematically the overall arrangement of a system according to the invention adapted for use with a four channel protection system. Signals generated by the detectors 17 and thermocouples 19 assigned to each of the four protection channels indicated by the numerals in FIG. 2 or 5, are amplified in amplifiers 51, and converted to digital signals and multiplexed in an analog to digital converter and multiplexer unit 53 for transmission to a microprocessor system 55 dedicated to that channel. The amplifiers 51 and A/D converter and multiplexer 53 are located inside the containment structure 57 surrounding the reactor vessel 3 while the microprocessor systems 55 are all outside the containment. As will be discussed in more detail below, the microprocesor systems 55 generate completely independent signals representative of the total core power but exchange detector and thermocouple data for use in determining localized power conditions. The data are exchanged through fiber optic data links 59 which maintain electrical isolation between the protection sets. As indicated by the numerals adjacent the data link connections, each microprocessor system 55 sends data to, and receives data from, every other microprocessor system. The microprocessor systems process the detector and thermocouple signals in a manner to be discussed in detail below and, if appropriate, generate alarms which are transmitted to the operator's console and partial trip signals for a four channel protection system when preselected criteria are exceeded. The protection system (not shown) applies voting logic to the partial trip signals to trip the reactor when a selected number of the channels, such as two out of the four, indicate that the limits have been exceeded. Such multi-channel protection systems which monitor many other reactor parameters in the same manner are well-known in the art. They provide reliability through redundant channels but minimize spurious trips by requiring coincidence of trip conditions in two or more channels. The system described here provides two different kinds of inputs for the protection system. As part of the core-wide power monitoring function, it generates the partial trip signals for the High Neutron Flux Reactor Trip of the protection system. While the local overpower monitoring capability was devised specifically to provide effective protection against the consequences of unintended water displacer rod cluster withdrawal, it is believed to be capable of satisfying all of the nuclear power distribution input requirements of the kilowatt per foot (KWFT) and departure from nucleate boiling ratio (DBNR) Reactor Power Trips. Both the core-wide and local overpower monitoring capabilities are supported by a reference power distribution calculator. The nuclear power level and power distribution data that are available in the four channels can be extracted from the system through suitable isolation devices and utilized for reactor control and surveillance purposes, as desired.

Figure 8:
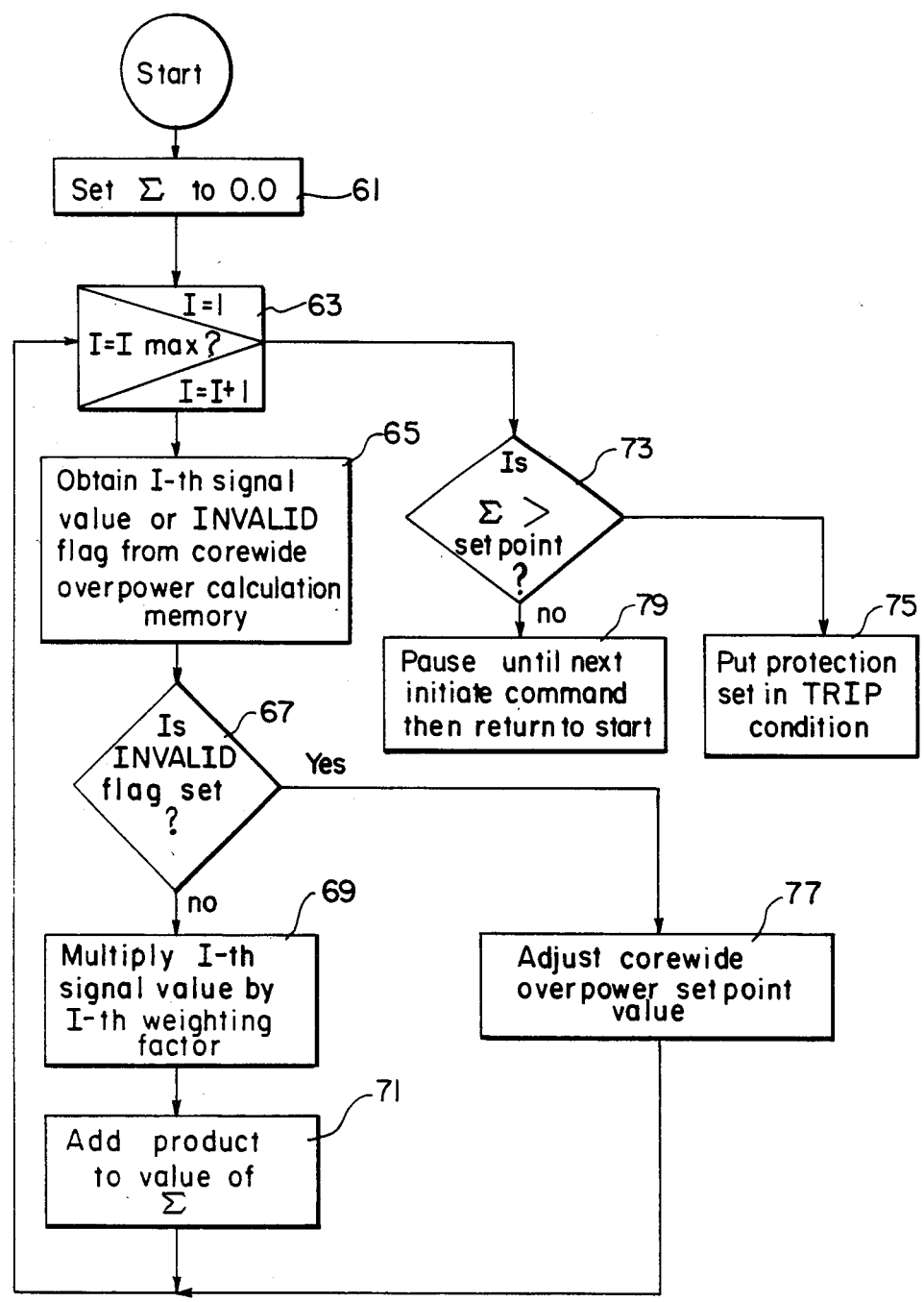
FIGS. 8, 9a through d, 10a and b, 11a and b, and 12 are flow charts employed by the microprocessors of the system shown in FIG. 7 to carry out the invention.

In carrying out the core-wide and local overpower functions, each of the microprocessor systems 55 receives the digitalized detector and thermocouple signals in the assigned channel, checks them for being within the range of valid signals, applies transient compensation and a calibration factor to valid signals, and stores them in memory. An invalid flag is stored for those signals which are out of range. Each channel then performs its own calculation of the core-wide overpower monitoring function as shown in FIG. 8. As indicated in block 61, a register $\Sigma$ representative of core-wide power is initially set to zero. A loop is then entered at block 63 in which calculations are carried out for each flux detector 17 assigned to the channel. The number of flux detectors, I, assigned to each channel is 75, fifteen strings of 5 detectors each, except for channel 4 in the arrangement of FIG. 5 which is assigned 16 detector strings so that I has a value of 80. For each detector, the stored value of the detector response is obtained in block 65, and if the invalid flag is not set, as determined in block 67, it is multiplied by a weighting factor in block 69 and the product is added to $\Sigma$ in block 71. The weighting factor is a ratio which correlates the detector response signal to the proportion of core power that it represents. The weighting factors are established by assigning to each detector in a channel an associated part of the core total volume such that each detector is surrounded by its nodal volume and the sum of all the nodal volumes assigned to any one protection set is the total core volume. The weighting factor is then generated as the ratio of the total integrated power in the node associated with each individual detector to the detector response signal. The sum of the products of the current detector response signal values by the individual weighting factors (which equals integrated nodal power divided by detector response under reference conditions) is then an estimate of the current total power.

When the power detected by all the valid detectors has been added up, the sum is compared to a set point value in block 73. If the set point value is exceeded, indicating a core-wide overpower condition, a partial trip signal for the channel is generated in block 75. The core-wide overpower set point for each protection channel is the total core power level at which a reactor trip is required, typically 1.09 times the rated power level. If a detector in a particular protection channel is declared invalid in block 67, the set point value for that channel is reduced in block 77 by the ratio of the sum of the reference nodal powers less the nodal power in the node associated with the failed detector divided by the sum of all of the nodal powers, as defined for that channel. If the total power setpoint, as revised if appropriate, is not exceeded in block 73, the system waits in block 79 for the next command.

The local overpower monitoring function is more complicated. As indicated in the flow chart of FIG. 9a, after each of the microprocessor systems has completed its update of current detector response values, block 81, the current response values or invalid flags associated with each detector in each channel are transmitted to each of the other channels over the fiber optics data links 59, as indicated in block 83. The program then enters a loop at block 85 where at each elevation, K, (which equals 5 since there are 5 detectors in each string) a subloop is entered at block 87. In this subloop, the response of each detector 17 at that elevation in each detector string J (which equals 60 or 61) is compared with the stored reference value in block 89, and the deviation is then compared with the stored most recent value of the deviation in block 93. If neither of the difference signals $\Delta$ and $\delta$ resulting from these comparisons exceeds a set point value as determined in blocks 95 and 93 respectively, the same evaluation is performed on the detector response signals at each successive elevation in the core. If any of the detector responses at any of the elevations exceed either set point value, a reference flag is set in block 97 indicating that the reference pattern should be updated.

If the current value of any detector response has changed significantly since the last evaluation as determined in blocks 93 or 95, a check is made to determine if any of the rods have moved since the reference pattern was generated. This is accomplished by first acquiring in block 99 of FIG. 9b, the rod position data from the rod position indicating systems referred to above. In the APWR, some of the water displacer rod clusters 49 and gray rod clusters 41 are locked in place and are moved only when a certain level of core burnup is reached while others are manipulated to regulate power for load following. If the position indicators for any of the fixed or free water displacer rod clusters or gray rod clusters as determined in blocks 101 105, 113 and 117 respectively, or any of the control rod clusters as determined in block 121 of FIG. 9c, indicate that the associated rod cluster is not in the position it was at the time the reference pattern was generated, the responses of the detectors affected by such a difference in position are adjusted so as to eliminate the effect of that movement as indicated in blocks 103, 107, 115, 119 and 123. Since rods in symmetrical locations are moved as a group, the adjustment must be made to the detectors affected in each quadrant of the core. A check is also made in block 111 to determine if any control rod group has moved out of sequence. As mentioned previously, the control rods are programmed to move in a selected sequence in order to maintain core power distribution within limits. If a control rod group moves out of the programmed sequence, the responses of the affected detectors in each quadrant are adjusted in block 113 to eliminate the effect and the operator is advised of the malfunction.

With the adjustments made in block 101 through 123 the detector responses are adjusted for detected rod movement so that the adjusted responses should closely match the stored reference pattern. However, the position information acquired in block 99 is obtained from the four channel protection sets which assume for instance, that if three out of the four position indicators for a group of rod clusters indicate that the group has moved, the fourth indicator has malfunctioned. However, another possibility is that the drive mechanism for the fourth cluster in the group has failed and that therefore, the indicator is correct. Another malfunction might be that a rod cluster has become separated from its drive rod. Since the position indicator system detects movement of the drive rod, it will indicate that a particular rod cluster has moved when in fact it has not. In order to check for such malfunctions, a search is made in block 125 for possible misalignment of a single water displacer rod cluster, gray rod cluster or control rod cluster using a pattern recognition procedure. The details of the pattern recognition procedure are discussed in connection with FIG. 12 below.

If a single water displacer rod cluster 49, gray rod cluster 41 or control rod cluster 35 is out of position, as determined in block 127, an operator alarm is generated in block 131 and the affected detector responses are adjusted in block 131 to eliminate the effect. Such a single rod cluster misalignment affects only the detector responses in the associated quadrant, unlike the group movements considered above. If the misalignment was not a withdrawal as determined in block 133 by the fact that the adjustment factors applied in block 131 are not positive, signals are sent in block 135 to the rod control system 13 to prevent withdrawal of other rods. This is done because if the misalignment was not a withdrawal, the reactivity at the location of the misaligned cluster is lower than the reactor control system has commanded. If not inhibited, the control system will call for additional rod withdrawal in order to generate the power level commanded, which could lead to overpower conditions in other parts of the core and/or unacceptable skewing of the power distribution.

Whether or not there was a misalignment of a single rod cluster, the X-Y deviation distribution of the detector responses and the absolute power distribution at the elevation being examined are generated in block 137 of FIG. 9d using the two dimensional power distribution synthesis procedure which is described in detail in connection with FIG. 15. This procedure provides a continuous function which can be used to determine the power generated at any point in the core at the elevation being examined with sufficient resolution to determine the power generated by each fuel rod in each fuel assembly if desired. However, it is well-known that there are certain fuel rods that are more likely than others to be subjected to overpower conditions because of the physics of the core. Thus, a loop is entered at block 139 in which the local power is examined at L selected locations in the X-Y plane. In the described example, L is equal to 100, however, any number of locations can be monitored. If the power at any of the selected points exceeds the permissible power as determined in block 141, a partial trip signal is generated for the protection set in block 143. Even though the trip limit is not exceeded, a local power level in the X-Y plane above a second somewhat lower selected level as determined in block 145 warrants further investigation because it is possible that a power level above the trip level may exist in the axial direction between the elevations, K, at which the detailed X-Y analysis is made. Under these conditions, the pointwise check flag is set in block 147 and the value of the index L is stored in block 149. After all of the potential hot spots L have been checked, the program returns to block 85 in FIG. 9a and a similar X-Y analysis is made at the next elevation.

When an X-Y analysis has been performed at all elevations at which detectors 17 are located, and there is an indication that a pointwise check for overpower conditions is needed, as indicated in block 151 in FIG. 9a, a local X-Y-Z absolute power distribution is generated in block 153 for each X-Y core region indicated by a stored value of L using the pointwise axial power distribution synthesis procedure described in connection with FIG. 16. From the axial power distribution, the peak power point in the local region is located and if this peak power exceeds the plant KWFT limit in block 155, a KWFT partial trip signal is generated in block 157. When all of the potential hot spots have been checked, the program returns to start through block 159.

Figure 9A:
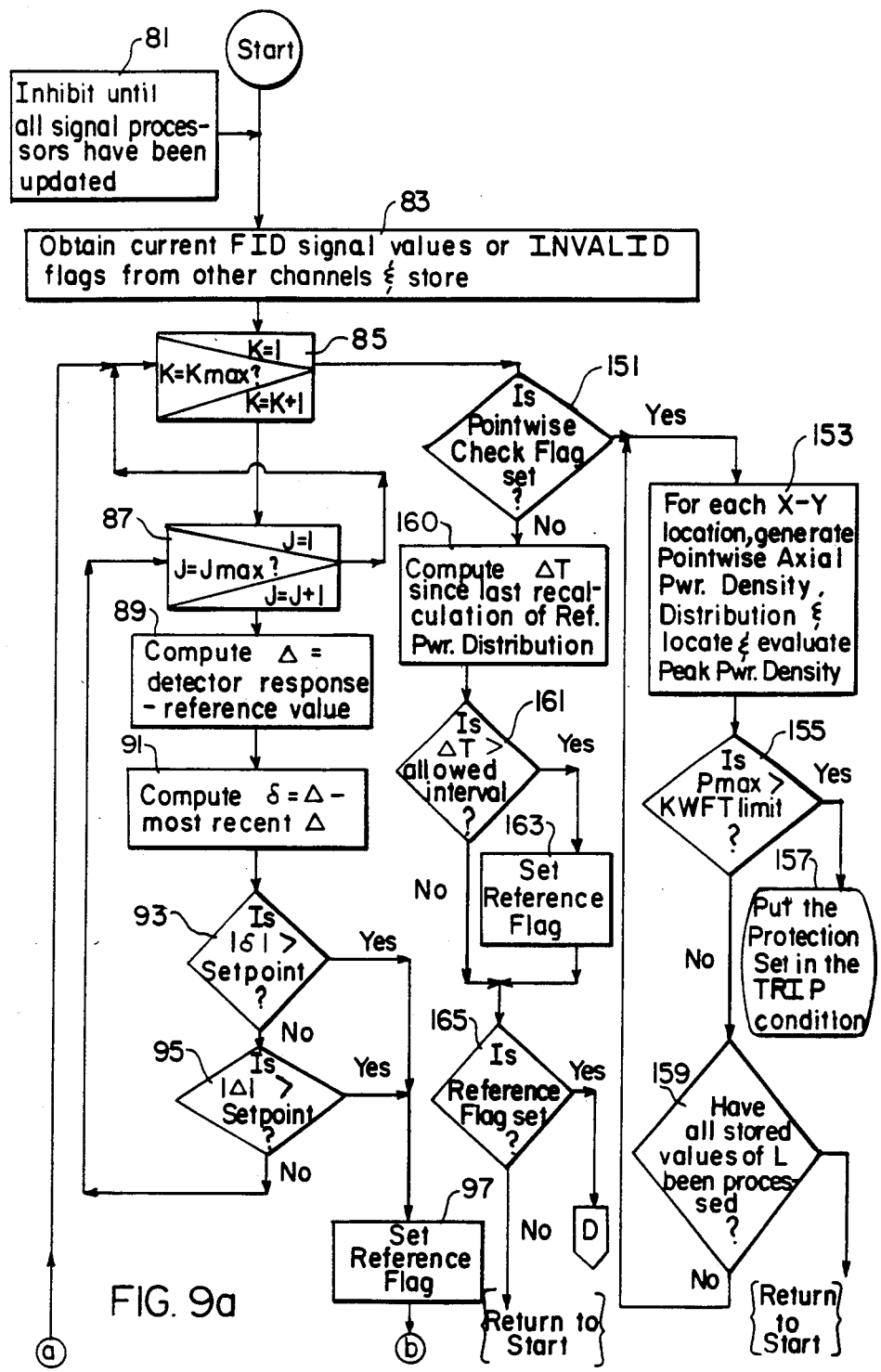
Figure 9B:
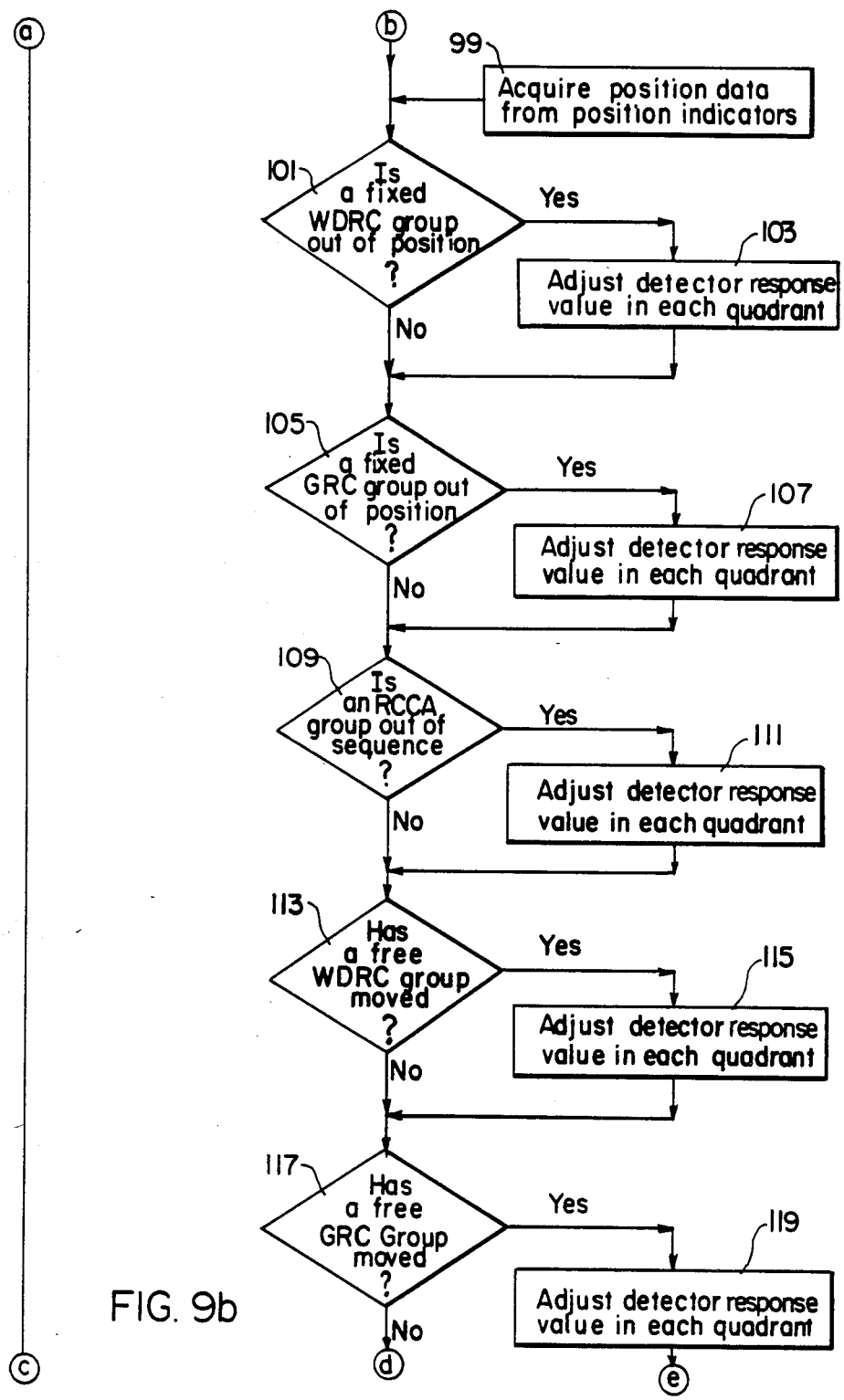

If, as determined in block 151 of FIG. 9a, there is no need to make a pointwise power check, a determination is made in block 160 as to the elapsed time since the last recalculation of the reference power distribution and if the selected interval has elapsed as indicated in block 161 the reference flag is set in block 163. If, when checked in block 165, the reference flag has not been set, either by the passage of time, or as a result of a difference between the two most recent responses of a detector or the most recent response and the reference value, the program returns to start.

Figure 10A:
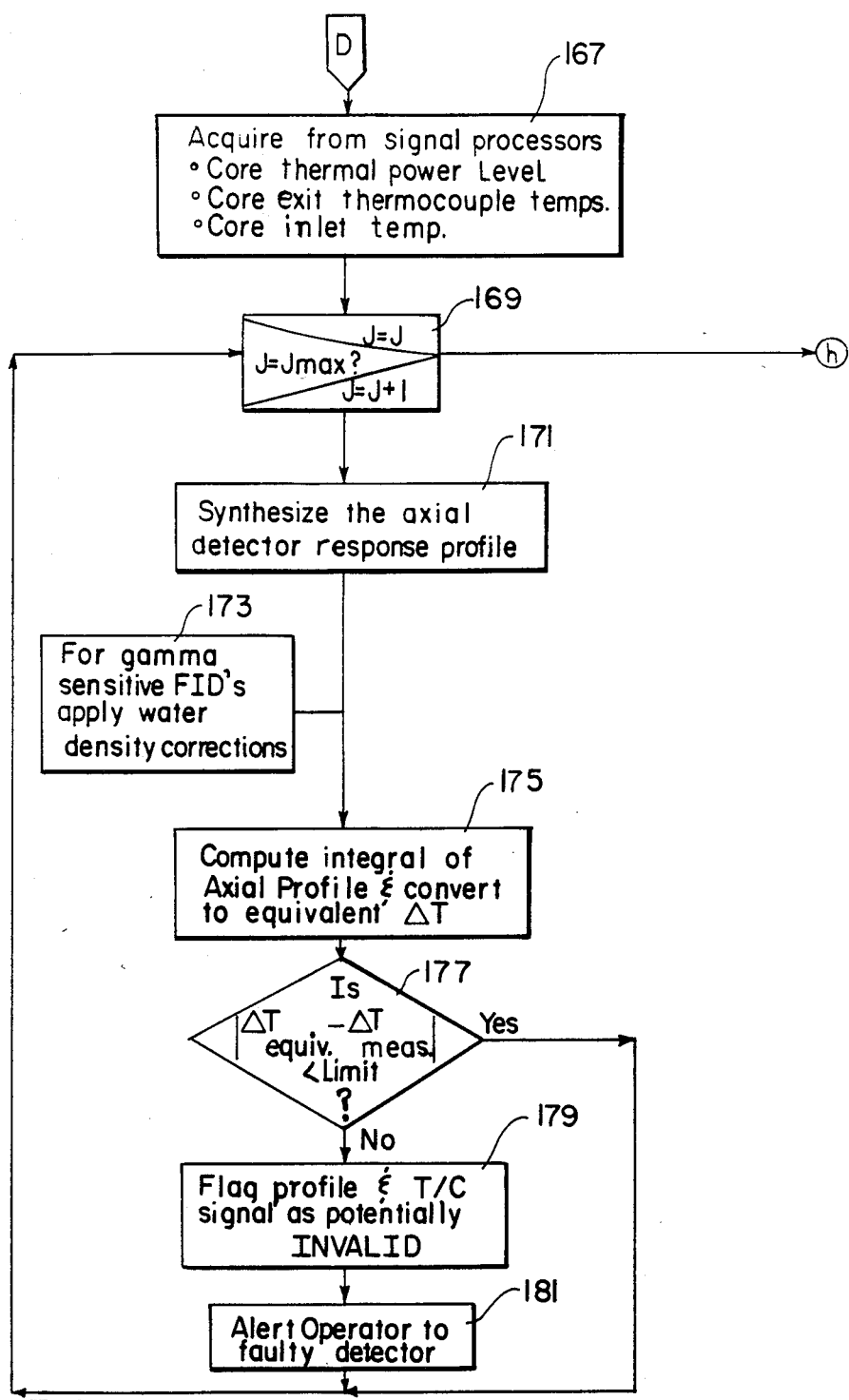
Figure 10B:
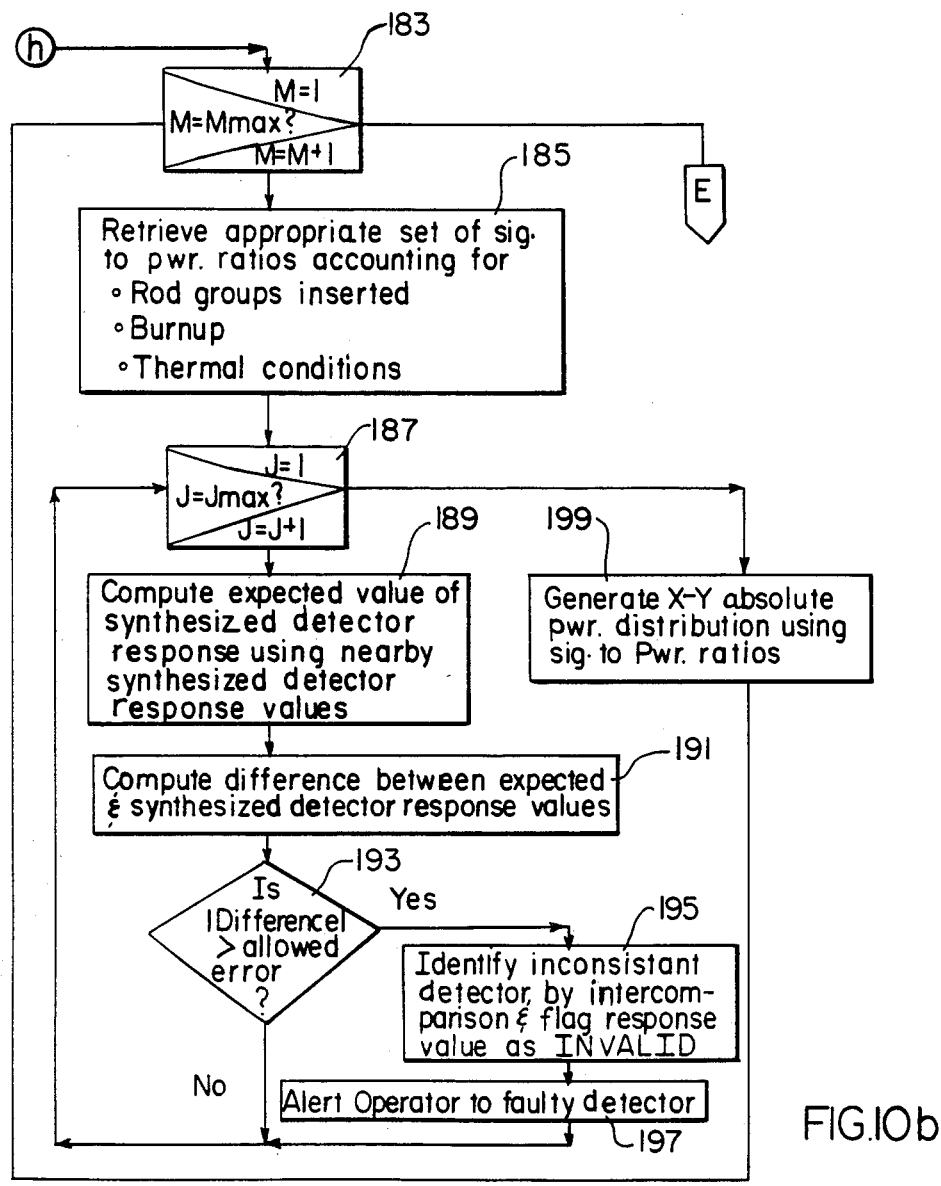

If the check of the reference flag in block 165 of FIG. 9a reveals that the flag has been set, a reference generator routine is entered on FIG. 10a at block 167 by acquiring from the other microcomputer systems the core exit thermocouple temperatures, and from independent monitoring systems, the core inlet temperature as measured in inlet 5, and the core thermal power level as measured by, for instance, a nitrogen 16 detector. A loop is then entered at block 169 in which an axial detector response profile is synthesized for each detector string, J, in block 171. This is accomplished by using the values of the response signals of the several detectors in the string to estimate by an interpolation process what the values of the detector responses would be if detectors were installed at intermediate points between the axial locations of the existing detectors. The interpolation process can be based upon least squares fitting with polynominal or trigonometric functions. Either approach should be augmented by using a predetermined masking function to account for the effects on the axial detector response profile of structural grids in the fuel assemblies and of localized nonuniformities in the axial burnup distribution. Alternatively, a many point axial detector respnse profile can be generated by using an empirical direct correlation algorithm based on calibrations made against detailed axial detector response traces obtained under reference conditions with movable incore detector mapping systems.

If gamma sensitive detectors are used as the fixed incore detectors (FIDs) 17, water density corrections are applied to the axial detector response profile in block 173. The integral of the axial detector response profile is then computed in block 175 and converted to the equivalent change in temperature $\Delta T$ of the reactor coolant passing through the core at the location of the detector string being examined using techniques well-known in the art. This equivalent $\Delta T$ is then compared in block 177 with the measured $\Delta T$, calculated as the difference between the associated core exit thermocouple temperature and the core inlet temperature. This provides a check on the axial detector response profile synthesis and also on the detector and thermocouple responses. If the difference between the equivalent and measured $\Delta T$s exceeds a preset limit, the axial detector response profile and the thermocouple signal are flagged as potentially invalid in block 179 and the operator is alerted of this condition in block 181.

Upon completion of the synthesis of all of the axial detector response profiles and of all of the temperature checks, the axial detector response profiles are checked against one another and an X-Y absolute power profile is generated from them at each of a number of horizontal planes m (where m equals for instance, 30 to 60) in a loop entered at block 183. The first task in this loop is to retrieve in block 185 a set of signal to power ratios which include compensation for the effects of rod insertion on the detector responses at the level under examination. A subloop is then entered at block 187. In this subloop, an expected value of each of the synthesized detector responses for each string, J, is computed in block 189 from the values at that elevation of the nearby synthesized axial detector response profiles computed in block 171 through interpolation using the appropriate set of signal to power ratios retrieved in block 185. In other words, by knowing the response value at nearby detector string locations in the horizontal slice of the core under consideration, and the position of the various rods, a calculation is made as to what the response value should be at the selected detector string location. The difference between this expected response and the response indicated by the profile computed in block 171 is then calculated in block 191 and if this difference exceeds an acceptable limit as determined in block 193, the inconsistent detector response is identified by intercomparison and flagged as invalid in block 195. The operator is alerted to this condition in block 197. When all of the detector strings at the level under examination have been checked, an X-Y absolute power distribution for each fuel assembly at that level is generated in block 199 using the detector responses and the signal to power ratios retrieved in block 185.

Figure 11A:
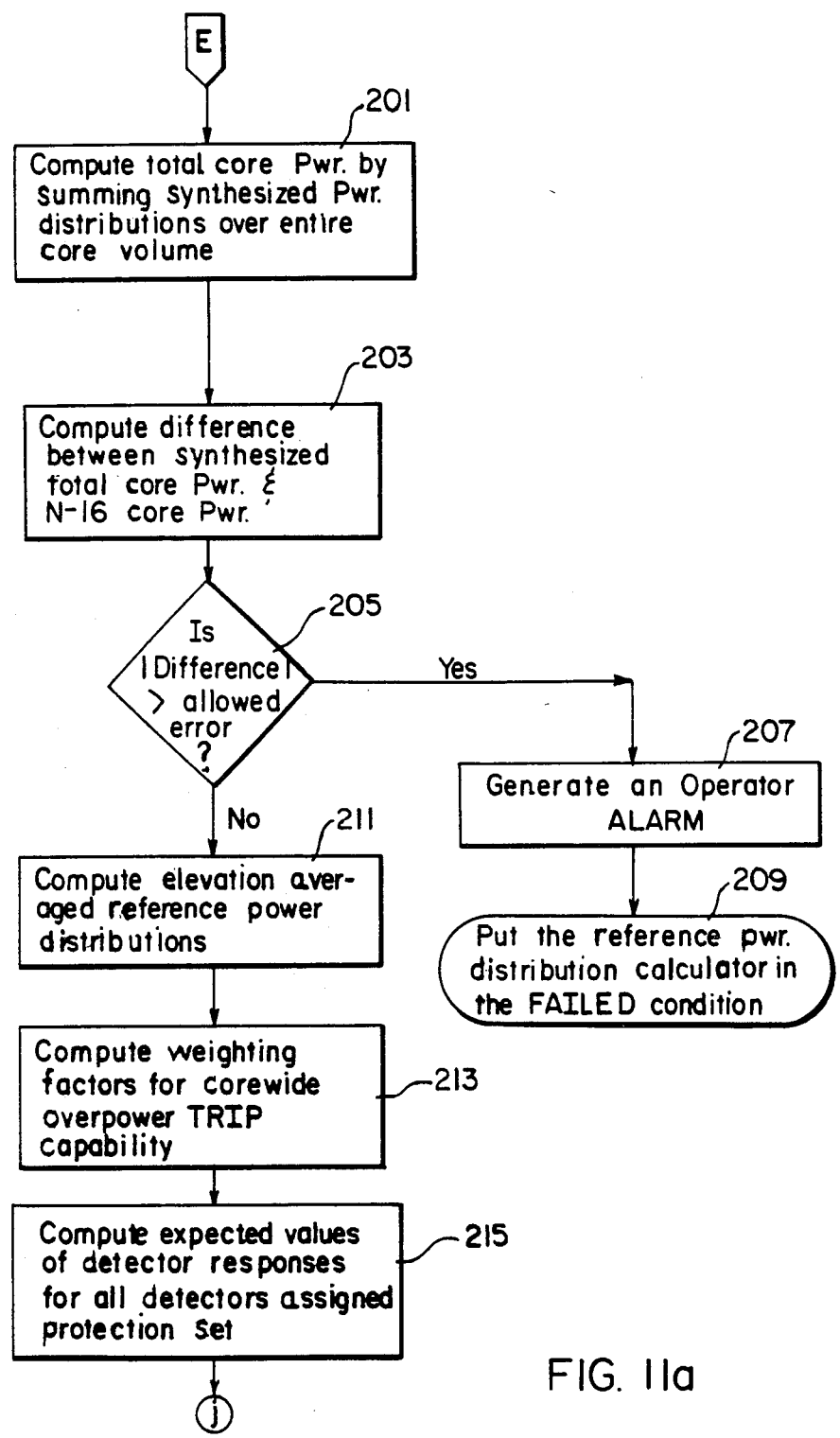

After the X-Y power distributions at all the levels m have been generated from the signal to power ratios, the total core power is computed in block 201 of FIG. 11a by summing the synthesized power distributions over the entire core volume. This synthesized total core power is then compared with the measured power, for instance from an N16 detector, in block 203 and, if the difference exceeds a preset limit as determined in block 205, an operator alarm is generated in block 207 and the reference power distribution calculator is placed in the failed condition in block 209. This is a check on the reasonableness of the synthesized absolute power distribution generated in block 199 and serves as another check on the detectors.

If the difference between the synthesized total power and the measured total power is within limits, the synthesized detector response values at the various elevations, m, adjacent each actual detector location are averaged in block 211 to generate the new reference power distribution at each detector elevation. These are X-Y power distributions which provide a reference for the power at any point in the planes formed by the axially spaced detectors. Next, the weighting factors used in block 69 of the corewide overpower calculation routine described in connection with FIG. 8 are calculated in block 213 for the new reference power distribution using the techniques discussed there.

Figure 11B:
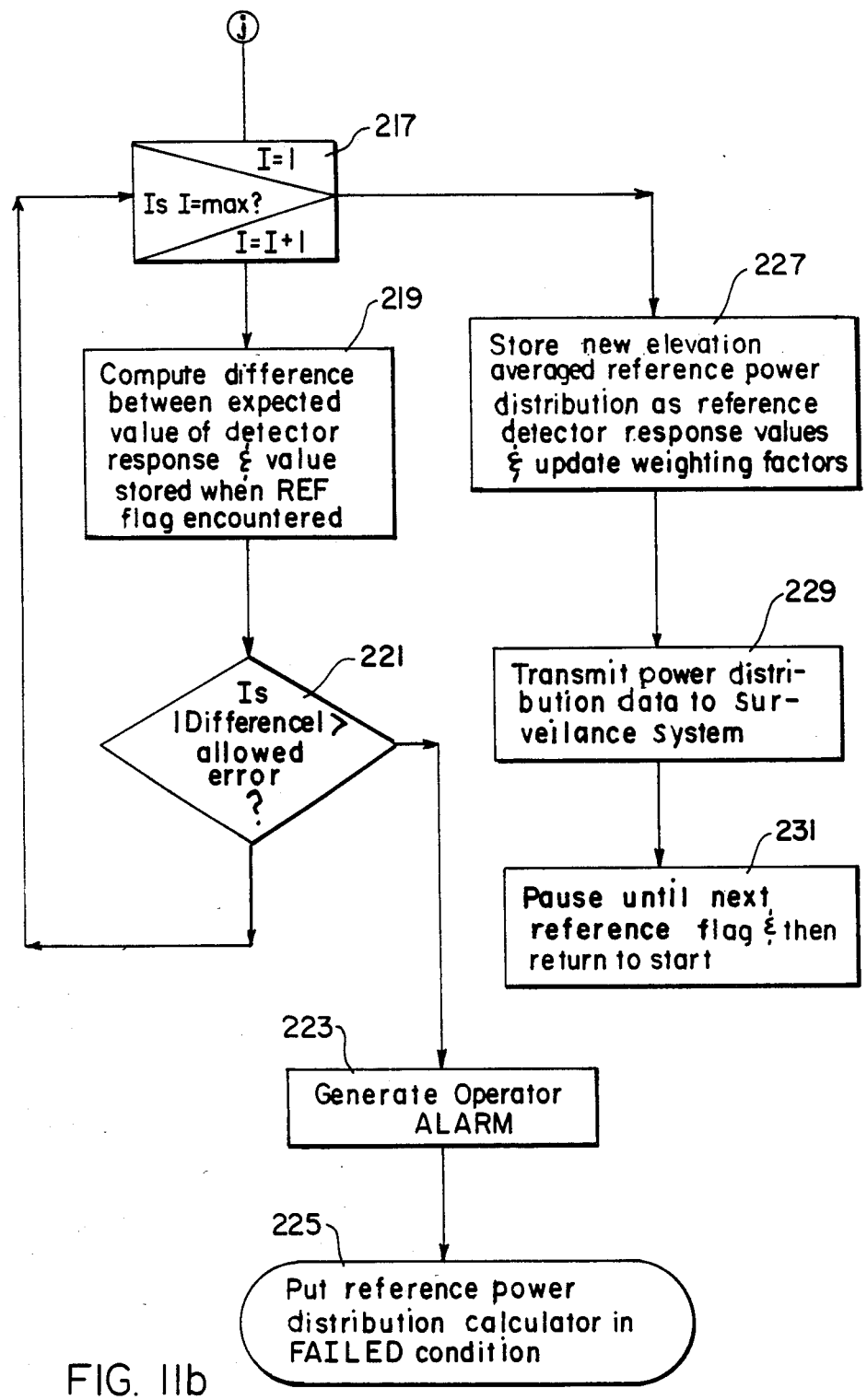

One final check is carried out by computing in block 215 from the reference power distributions generated in block 223, the expected value of the detector responses for all the detectors in the associated protection set. A loop is then entered at block 217 of FIG. 11b in which each of these expected values for the I detectors in the protection set is compared in block 219 with the value of the corresponding detector response stored when the reference flag was encountered. Since it was these stored values which were used to calculate the new X-Y reference power distribution, the difference between the stored and expected value of each detector response should be reasonably close. If it is not, as determined in block 221, an operator alarm is generated in block 223 and the reference power distribution calculator is placed in the failed condition in block 225.

If all of the tests are passed, the new X-Y, elevation averaged reference power distributions generated in block 211 are stored in block 227 as the new reference detector response values, and similarly the weighting factors are updated by the new values generated in block 225. Finally, the reference power distribution data are transmitted in block 229 to a surveillance system, where it may be used for various purposes such as generating an operator display of the power distribution throughout the core, for use in an automatic reactor control system, and for on-line, automatic generation of representations of burnup status of each fuel assembly and the accumulated exposure of the control rods and gray rods. The routine then pauses in block 231 until the next reference flag causes it to return to start.

Figure 9C:
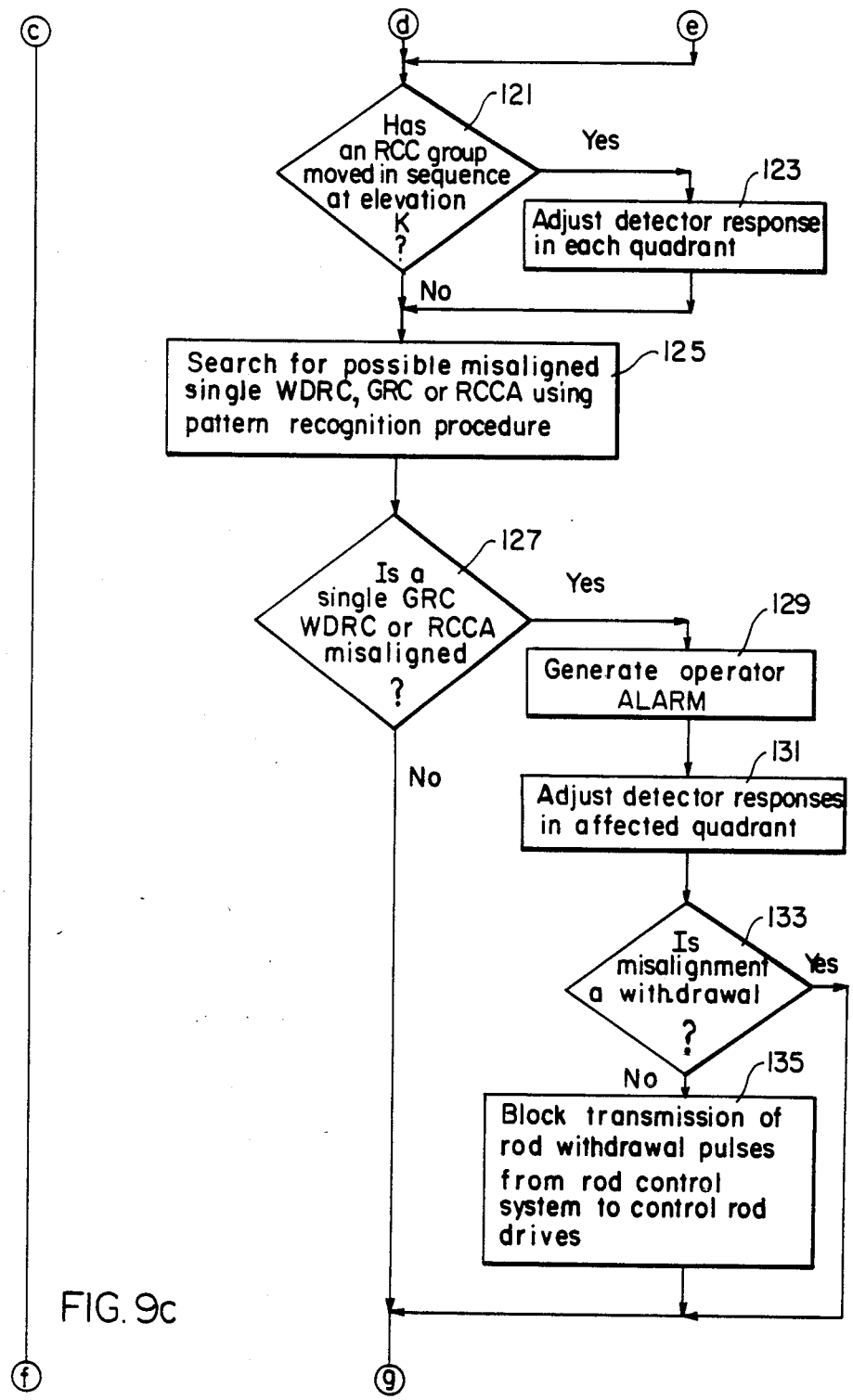

The pattern recognition procedure used in block 125 of FIG. 9c to search for possible misaligned rod clusters involves successively assuming that selected rod clusters are misaligned, obtaining a least squares fit of the fractional effect such a misalignment would have on the response of nearby detectors in terms of the deviations of the detector responses from the reference values, and evaluating the mean square errors. The best fit is indicated by the assumed misalignment which generates the minimum mean square error. If this minimum mean square error is above a preselected value, the detector responses indicate that this rod cluster is, in fact, misaligned. The rod clusters which are selected for testing for possible misalignment are those in the vicinity of the detector recording the highest adjusted deviation from the stored reference value.

Figure 12:
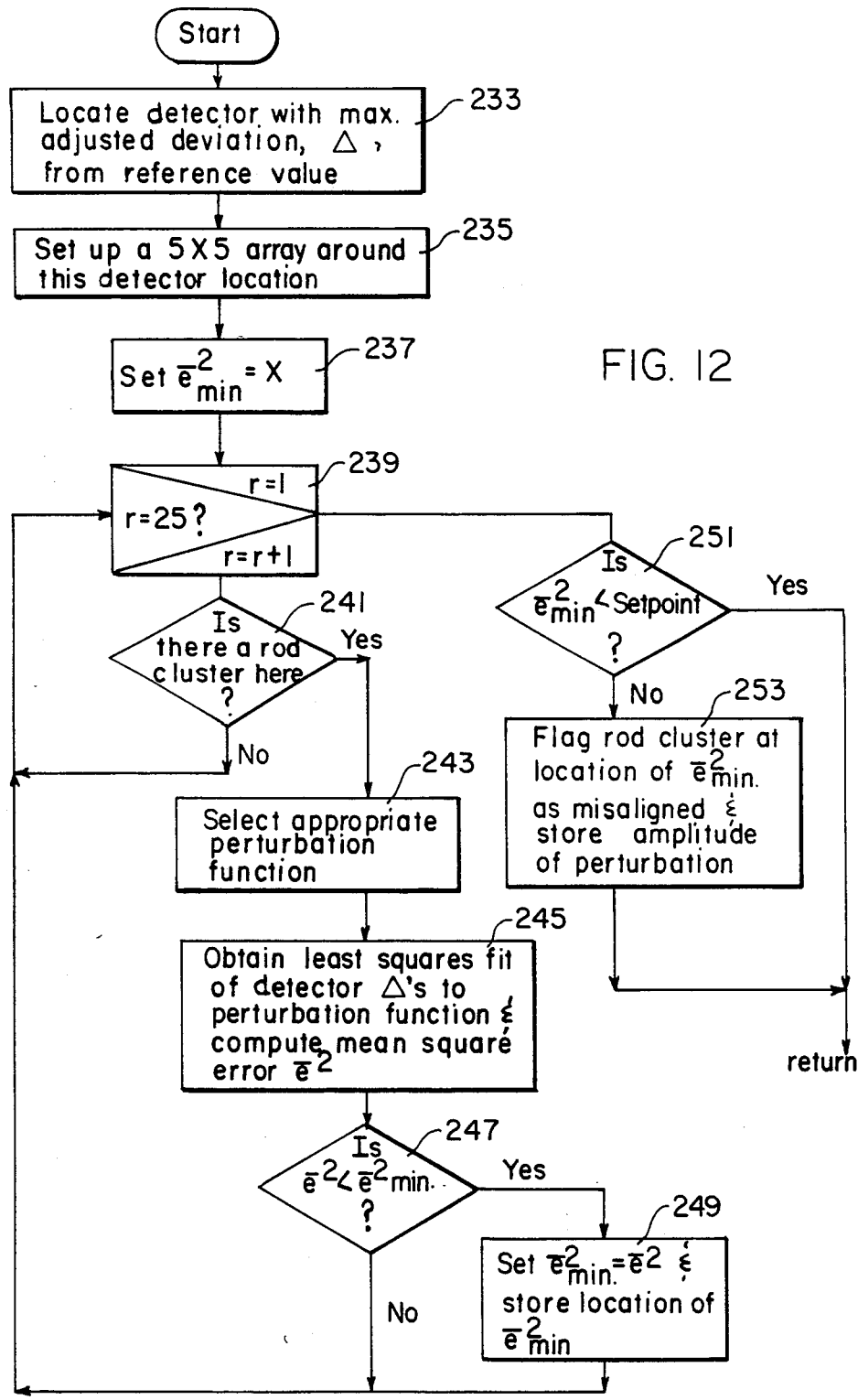

FIG. 12 is a flow chart for carrying out the pattern recognition procedure. In block 233, the current deviation ($\Delta$) distribution for the elevation of interest, adjusted for known rod cluster movement, is searched to locate the maximum absolute deviation of measured detector response from reference detector response. A small domain of fuel assembly locations, typically a $5 \times 5$ array, is then established centered on the fuel assembly location at which the maximum absolute detector response deviation occurs as indicated in block 235. A minimum means square error register is then set in block 237 to a value x which, if exceeded, is an indication of a misaligned rod cluster.

With these initial conditions established, a loop is entered at block 239 in which it is assumed successively for each of the 25 fuel assemblies in the $5 \times 5$ array that the associated rod member is misaligned. Since some of the fuel assemblies near the edge of the core do not have rod clusters, these locations are bypassed as indicated at block 241. For those fuel assemblies having an associated rod cluster, a perturbation function, which is a stored set of numbers repesenting the expected fractional effect on nearby detectors of the misalignment at the fuel assembly location under consideration, is selected in block 243. In the example, the perturbation functions indicate the effect of the assumed misalignment on detectors falling within a $5 \times 5$ fuel assembly pattern centered on rod cluster locations under test. For the disclosed reactor core, ten different perturbation functions are stored in memory. By rotating the patterns and/or generating a mirror image, this file of ten patterns is sufficient to cover the effects of a misalignment of any one of the control rod or water displacer rod clusters in the core. With the selected perturbation function properly oriented relative to the assumed location of a misaligned rod cluster, a least squares fit of that perturbation to the adjusted detector deviations is carried out in block 245. Of course, there will not be a detector reading for each of the 25 fuel assemblies covered by the perturbation function when centered on the assumed location of the misalignment, and it is possible that some of the detectors which fall within the coverage of the perturbation function will be out of service, however, a mean square error, $\overline{e}^2$, normalized for the number of valid detector responses is computed. If this mean square error is the smallest error found to date, as determined in block 247, its value is stored as the minimum mean square error along with the location of the assumed misalignment as indicated in block 249. The assumed misalignment that generates the smallest mean square error produces the best fit of its associated perturbation function to the detector deviations adjusted for known rod movement, and if this minimum mean square error is above a set point value, as determined in block 251, the rod cluster under consideration is flagged as misaligned and the values of the perturbation are stored in block 253.

Figures 13A, 13B, 13C, 13D:
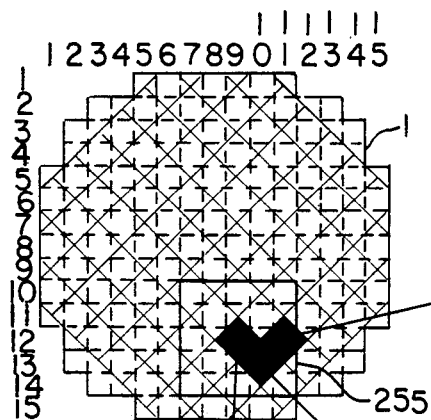
FIGS. 13a through d are examples of perturbation functions used in accordance with the teachings of the invention to determine if any of the rod clusters of the reactor core are misaligned and their relationship to specific fuel assemblies in the core.

A better understanding of the pattern recognition procedure can be gained by reference to the example illustrated by FIGS. 13a through d and 14. FIG. 13a illustrates a reactor core with each fuel cell identified by a column, numbered along the top, and a row, numbered down the side. If it is assumed that the maximum deviation of the adjusted detector response determined in block 233 of FIG. 12 occurs at column 9 row 12 a 5×5 array, as indicated by the heavy line 255 in FIG. 13a, would be set up around this location. While each of the rod clusters that fall within this array would be tested for misalignment, only three have been selected here for the purpose of illustration. FIG. 13b illustrates the fractional changes in the incore detector responses in the event of a withdrawal of the water displacer rod cluster located at column 11, row 12. Similarly, FIGS. 13c and d represent the perturbation functions associated with misalignment of the water displacer rod clusters at locations column 10, row 13 and column 9, row 12 respectively. It is evident that the response patterns are detectably different for each WDRC withdrawal. It is also clear that the effects are strongly localized. If the individual arrays had been extended to a 7×7 size, most of the entries in the outer locations of the array would include changes in sensor response on the order of 1%.

Figures 14, 16:
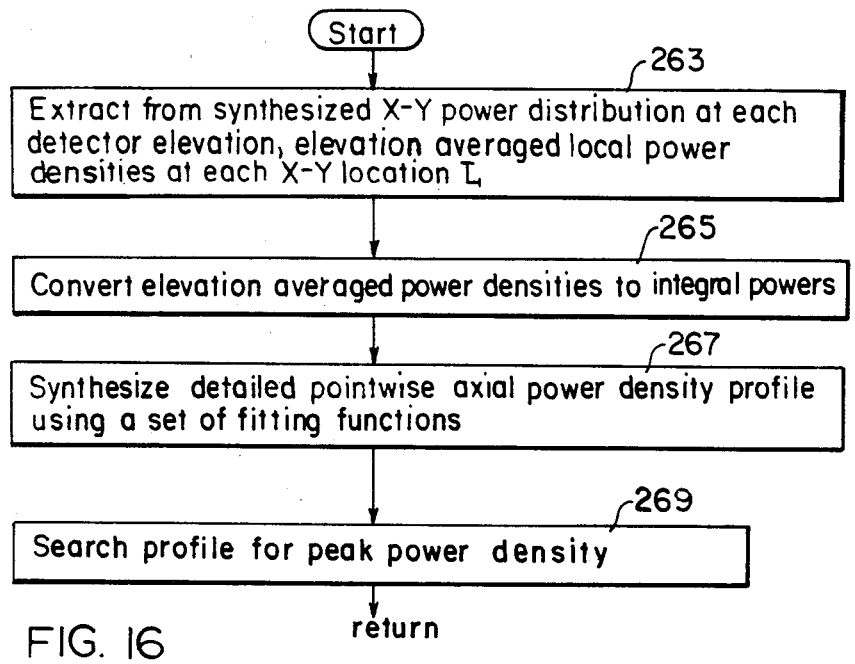
FIG. 14 is a composite of the perturbation functions illustrated in FIGS. 13b through d showing the fractional effect that misalignment of water displacer rods at those locations would have on the detector arrangement illustrated in FIG. 5.
FIGS. 15 and 16 are additional flow charts employed by the microprocessors of the system shown in FIG. 7 to carry out the invention.

FIG. 14 is a composite of the perturbation functions of FIGS. 13b through d with only the fractional effects appearing at the locations of detectors as arranged according to the distribution of detectors illustrated in FIG. 5. The numbers in each block are listed from top to bottom as the perturbation associated with a misalignment of the water displacer rod cluster at column 11 row 12, column 10 row 13 and column 9 row 12 respectively. It is evident from an examination of FIG. 14 that the withdrawal of each single WDRC results in a unique pattern of changes in sensor responses that can be recognized by application of suitable algorithms. It is also evident that the loss of a few of the detectors would not severely prejudice the ability to recognize these unique patterns. In the embodiment of the invention disclosed, a least squares fit of the adjusted detector deviation is made to the fractional effects shown in FIG. 14 for all detectors within a 5×5 array centered on the respective locations of water displacer rod clusters. As previously discussed, the best fit is indicated by the smallest mean square error, and if this minimum mean square error is large enough, it indicates that the associated rod cluster is withdrawn even though the position indicators indicate otherwise.

Figure 9D:
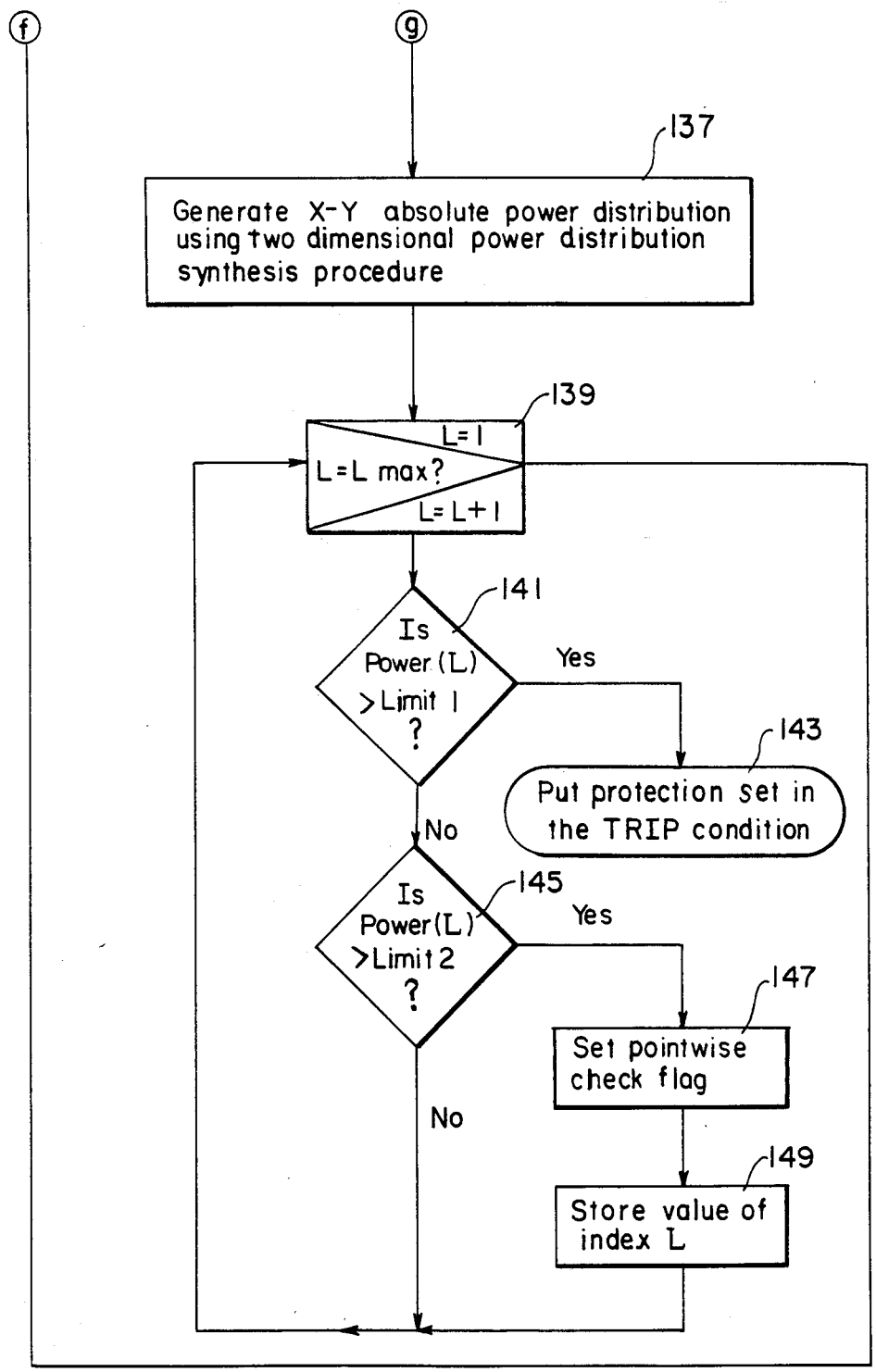
Figure 15:
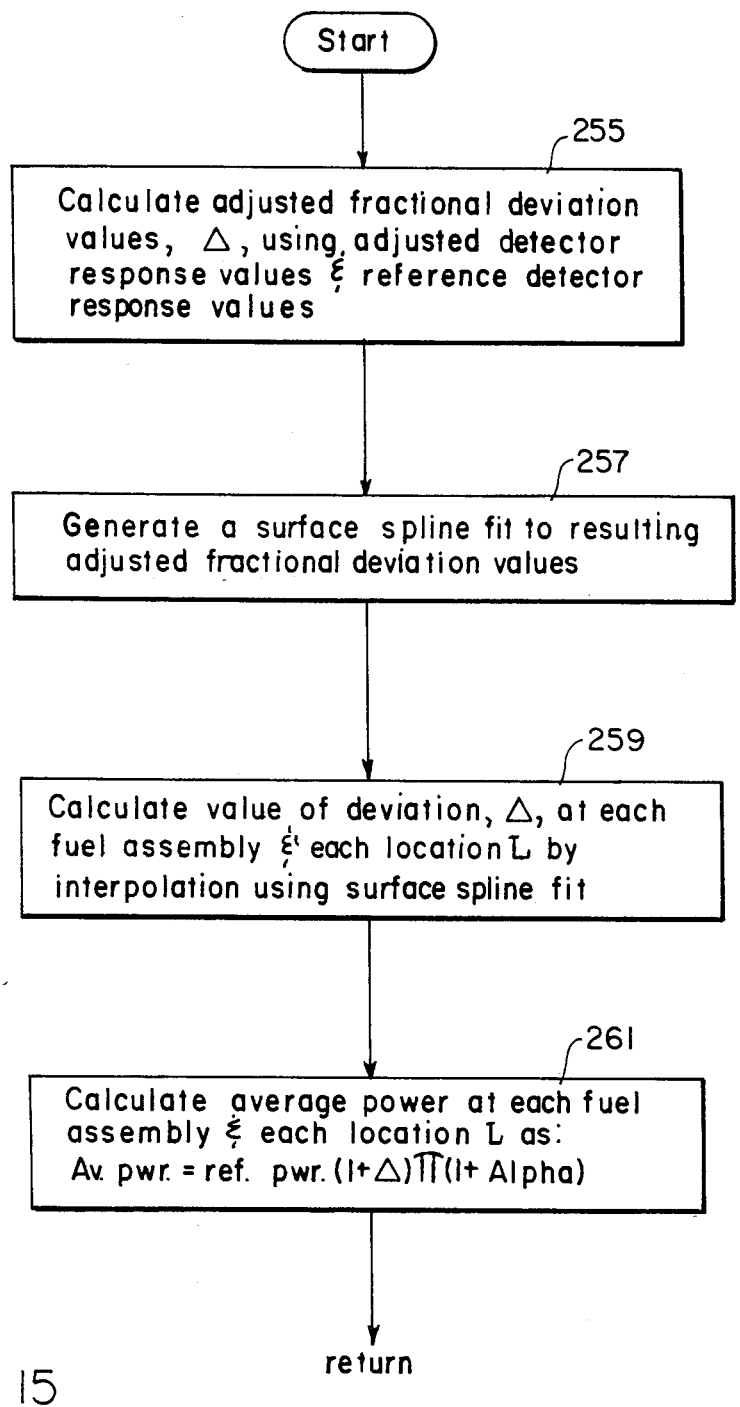

The two dimensional power distribution synthesis procedure referred to in block 137 of FIG. 9d for generating the X-Y absolute power distribution is described in detail in the flow chart of FIG. 15. First though, it should be appreciated that the purpose of this procedure is to generate a function which permits one to determine the power level at any point in the X-Y plane under consideration. This is accomplished by generating a function from the data available from the detector responses. However, changes in rod position can have sizable localized effects on the power distribution which can create distortions in any core-wide function generated from data derived from detectors subject to these effects. That is why in blocks 101 through 117 of FIG. 9b and blocks 121 and 123 of FIG. 9c, adjustments are made to the detector responses to eliminate the localized effects of known rod movement since the reference values were generated and for the effects of rod movements which are out of sequence. Similarly, the localized distortions caused by misalignment of a rod cluster are eliminated in blocks 125 to 131 of FIG. 9c. The perturbation functions used to make these adjustments for local effects are similar to those used above in connection with the pattern recognition procedure.

With all of the localized effects thus removed from the detector responses, the adjusted fractional deviations ($\Delta$) are calculated in the first block 255 of the two dimensional power distribution procedure described in FIG. 15 by determining the difference between the adjusted detector response values and the reference values. A surface spline fit to the resulting adjusted fractional deviation values is then generated in block 257. From this spline fit, the deviation at each desired location, which in the embodiment described includes all of the fuel assemblies and all of the potential hot spots L, is calculated in block 259. These $\Delta$s represent the core-wide fractional changes that have occurred since the reference conditions were last updated. They reflect, for example, the general effect that rod movement has had on core power and on the xenon distribution. These fractional deviations are then converted to absolute power readings by adding each of them to one and multiplying by the associated reference absolute power in block 261. The localized effects of rod movement are also incorporated back into the absolute power readings by removing from the products of the core-wide calculations all the adjustments introduced by the steps of blocks 101 to 123.

The generation of the pointwise axial power density distribution called for in block 153 of FIG. 9a is described in FIG. 16. The X-Y power density at each detector elevation for each X-Y location L is obtained in block 263 from the X-Y two dimensional power distribution synthesis procedure of FIG. 15. These power densities represent the average power generated in the vicinity of each detector. Since the detectors are not necessarily evenly spaced axially in the reactor core because, among other things, they should not be located close to structural grids which can distort the flux, the elevation averaged signals are converted to integral power signals in block 265 by multiplying each power density by the thickness of the X-Y slab over which the average power density applies. A pointwise axial power density profile is then synthesized from these integral powers in block 267 by applying a fitting technique as is well-known in the art. While in the described system, trigonometric sine functions were used, other functions which need exist only in pointwise form, could be used. The resultant pointwise axial power density profile is then searched in block 269 using conventional techniques to locate the peak density point.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of on-line synthesis of the local power in a nuclear reactor having rods which are inserted in and retracted from the reactor core axially to control the reactivity thereof and having fixed incore nuclear detectors distributed across the core, said method being operable despite misalignment of a rod and comprising the steps of:

generating and storing reference signals representative of the power in the core under reference conditions at a plurality of specified locations across the core including the location of the detectors and additional locations at which it is desired to determine the local power;

storing signals representative of the positions of the rods under the reference conditions;

detecting the positions of said rods with rod position indicators;

monitoring response signals generated by said detectors;

adjusting the detector response signals to substantially eliminate the local effects thereon of changes in rod position from the reference conditions as detected by the rod position indicators;

generating deviation signals as the fractional difference between the adjusted detector response signals and the stored reference signals for the detector locations;

determining from said deviation signals the location of any misalinged rods and adjusting said deviation signals to substantially eliminate the effects of such any misaligned rods;

generating signals representative of a fitting function fit to said deviation signals as adjusted;

generating signals representative of the deviation at each specified location from said fitting function signals;

adding to said deviation signals, signals representative of the fractional local effects on detector responses due to changes in rod position from said reference conditions as detected by said rod position indicators and due to any misaligned rods to generate current deviation signals for each specified location; and multiplying said reference signals by one plus the current deviation signal for the corresponding specified location to generate current power signals representative of the current local power level at each specified location.

2. The method of claim 1 wherein said core is made up of a plurality of fuel assemblies and said specified locations are the locations of each fuel assembly.

3. The method of claim 1 wherein each of said fixed incore detectors is one of a plurality of such detectors in a string spaced axially along the core with corresponding detectors in each of the strings at common levels and wherein the steps of claim 1 are carried out for each level of the detectors in the string to generate current local power signals for each of the specified points at each level of detectors in said detector strings.

4. The method of claim 3 extended to synthesize the power intermediate the levels of the detectors in said strings at a selected one of said specified locations in the core comprising the steps of:

selecting the current local power signals representative of the current power at said selected location at each level of the detectors;

generating signals representative of a fitting function fit to said selected current local power signals; and generating a signal representative of the current local power level at said selected point between said detector levels from said fitting function signals.

5. The method of claim 4 including the step after generating said fitting function signals of adjusting such signals by adding thereto signals which compensate for discontinuities in the function due to such conditions as the effects of structural grids and fuel burnup conditions.

6. The method of claim 1 adapted to verify the reliability of said detector response signals and said current power signals including the additional steps of:

generating a signal representative of the expected value of each detector response signal from the current power signals at nearby specified locations; and comparing said expected detector response signals to the actual detector response signals.

7. The method of claim 6 wherein said step of generating and storing the reference signals includes storing said current power signals at a selected point in time.

8. The method of claim 3 including the step of comparing each of the current local power signals to a first predetermined set point representative of a local overpower condition, and generating an overpower signal in response to a current local power signal which exceeds the first set point signal.

9. The method of claim 8 including the steps of comparing each of the current local power signals to a second set point signal smaller in value than said first set point signal, and, for a current local power signal which exceeds the second set point signal, generating an axial power distribution at the location of such a local power signal by generating signals representative of a fitting function fit to the current local power signals at each detector level at the location axially aligned with the location of such current local power signal, generating from said fitting function signals current axially distributed local power signals at a plurality of axially displaced levels between detector levels, identifying the axially distributed local power signal having the largest magnitude, comparing the magnitude of this signal to a third set point signal and generating an overpower signal when it exceeds said third set point signal.

10. The method of claim 9 wherein said third set point signal is equal to said first set point signal.

11. In a nuclear reactor having a plurality of rod members which are inserted in and withdrawn from fuel assemblies in the reactor core to control the reactivity thereof and having position indicating means for indicating the positions of the rod members, a method of identifying the misalignment of rod members from the positions indicated by the position indicating means, comprising the steps of:

distributing a plurality of nuclear detectors fewer in number than the number of fuel assemblies throughout the reactor core in selected fuel assemblies in a pattern such that movement of each rod member affects the response of at least one detector in a uniquely identifiable response pattern;

storing a set of pattern recognition signals representative of a fractional effect of the misalignment of a rod member on any detector located in a predetermined number of fuel assemblies around the location of said rod member for each unique location of a rod member;

generating for each detector location, a fractional deviation signal representative of the fractional difference between the actual detector response and an expected response based upon changes in rod number positions from reference conditions as indicated by the rod position indicating means;

selecting the detector having the largest deviation signal;

performing successively for each rod member within a preset distance of said selected detector, the following steps:

selecting from said stored set of pattern recognition signals the set applicable to the location of the rod member; and generating an error signal representative of the correlation of the selected pattern recognition fractional effect signals to the fractional deviation signals for all detectors located within said predetermined number of fuel assemblies from the rod member location;

comparing said errors and selecting the rod member for which the smallest error is generated; and comparing said smallest error with a preset value and generating a signal identifying said selected rod member as misaligned when said smallest error exceeds the preset value.

12. The method of claim 11 wherein the step of generating fractional deviation signals includes; generating and storing signals representative of the detector responses at a selected reference point in time and of the positions of the rod members at that time, monitoring the positions of the rod members, adjusting the actual detector responses to eliminate the local effects of changes in rod position from the positions indicated by the stored rod position signals, and generating the fractional deviation signals as the fractional difference between the adjusted actual detector responses and the stored reference signals.

13. The method of claim 12 wherein said detectors are arranged in a plurality of channel sets with the detectors in each channel set distributed throughout the core such that movement of each rod member affects the response of active detectors in a uniquely identifiable pattern even with one channel set out of service, and wherein a plurality of signal processors equal in number to said plurality of channels each receive the detector response signals from the detectors in each channel set and each of said signal processors performs all of the steps incorporated in claim 12.

14. The method of claim 13 wherein said predetermined number of fuel assemblies around a rod member for which each set of pattern recognition signals provides the fractional effect on detectors of a misalignment of that rod member is equal to the 25 fuel assemblies in a 5×5 fuel assembly array centered at the fuel assembly with which the rod member is associated.

15. The method of claim 12 wherein said preset distance of rod members from said selected detector for which said pattern recognition signals are correlated to detector responses is the distance encompassed by a 5×5 which said selected detector is associated.

16. In a nuclear reactor having a core made up of a plurality of square, elongated fuel assemblies arranged to form a generally cylindrical core and rod members which are axially inserted in and withdrawn from the fuel assemblies to control the reactivity of the core, a method of distributing a plurality of fixed incore nuclear detectors fewer in number than the rod members so that the misalignment of a rod member may be detected, said method comprising:

generating a set of worth signals representative of the fractional effect of a misalignment of a rod member associated with a specified fuel assembly on detectors located in a predetermined number of fuel assemblies around the selected fuel assembly; and placing said detectors in specified fuel assemblies in a pattern such that for the location of each rod member, the sum of the worth signals obtained from said set of worth signals for each detector located in a fuel assembly within said predetermined number of fuel assemblies around the rod member is at least a preset minimum value.

17. The method of claim 16 wherein said detectors are arranged in a number of channel sets, and said sets of detectors are placed in specified fuel assemblies in a pattern such that for the location of each rod member, and sum of the worth signals derived from said set of worth signals for each detector located in a fuel assembly within said predetermined number of fuel assemblies around the rod member is at least a preset minimum value even with one set of detectors out of service.

18. The method of claim 17 wherein said predetermined number of fuel assemblies around the selected fuel assembly is a square array of fuel assemblies centered on the selected fuel assembly.

19. The method of claim 18 wherein said square array is a 5×5 pattern of fuel assemblies centered on the selected fuel assembly.

20. The method of claim 19 wherein said rod members include water displacer rod clusters each comprising a plurality of water displacer rods connected together for insertion in and withdrawal from the core as a unit, said displacer rods in each cluster arranged in a pattern which is substantially square and is centered over a fuel assembly but is rotated 45° with respect to the fuel assembly, with the corners of the fuel assembly intersecting the midpoints of the sides of said square pattern which is larger than the fuel assembly, such that said water displacer rods in the cluster extend into the bordering fuel assemblies as well as the fuel assembly on which it is centered and such that with water displacer rod clusters centered over fuel assemblies in a checkerboard arrangement, said square patterns formed by the water displacer and rod clusters form a continuous array of contiguous squares extending across the cross-section of the core, and wherein said number of sets of detectors is four and said four sets are distributed across the core in fuel assemblies in a pattern such that for each water displacer rod cluster the sum of the worth signals obtained from said set of worth signals for each detector located in the 5×5 array of fuel assemblies centered on the water displacer rod cluster is at least a preset minimum value even with two out of the four sets of detectors out of service.

21. In a nuclear reactor having a plurality of square, elongated fuel assemblies arranged to form a generally cylindrical core, and a plurality of rod members which are inserted in and withdrawn from said fuel assemblies to control the reactivity of the core, apparatus for identifying the misalignment of a rod member comprising:

position indicators which generate position signals representative of the position of each of the rod members relative to the core;

a plurality of nuclear detector strings smaller in number than the fuel assemblies distributed across the core in selected fuel assemblies such that movement of each rod member produces a uniquely identifiable change in the response signals of at least one detector string; and signal processing means responsive to said position signals and the detector response signals for generating a signal identifying a rod member which is not in the position indicated by the associated position signal and for generating a signal representative of the quantitative effect of the misaligned rod on power distribution.

22. The apparatus of claim 21 wherein said detector strings are arranged in a preset number of channel sets which are distributed across the core of the reactor in selected fuel assemblies such that movement of each rod member produces a uniquely identifiable change in the detector response signals even with one set of detector strings out of service, and wherein a signal processing means is provided for each set of detector strings, said combination including means for transmitting the detector response signals associated with each signal processing means to each of the other signal processing means and each of said signal processing means generates signals identifying a rod member which is not in the position indicated by the position signals.

23. The apparatus of claim 22 wherein said rod members are water displacer rod clusters comprising a plurality of water displacer rods arranged in a square pattern which are inserted in and withdrawn from selected fuel assemblies and portions of the four laterally adjacent fuel assemblies such that with water displacer rod clusters aligned with a checkerboard pattern of fuel asemblies said water displacer rod clusters form a continuous pattern across the core, and wherein said preset number of channel sets of detector strings is four and said four channel sets of detector strings are distributed across the core such that movement of each water displacer rod cluster produces a uniquely identifiable change in the detector string response signals even with two of said channel sets out of service.

24. Apparatus for generating signals representative of the local power density in a nuclear reactor having a core made up of a plurality of elongated fuel assemblies arranged to form a generally cylindrical core and rod members which are inserted in and withdrawn from the fuel assemblies to control the reactivity of the core, said apparatus comprising:

position indicating means for generating position signals representative of the position relative to the associated fuel assembly of each rod member;

a plurality of detector strings each comprising several fixed incore nuclear detectors axially spaced in selected fuel assemblies distributed across the core, said detector strings being fewer in number than the fuel assemblies; and signal processing means responsive to the position signals and response signals generated by the fixed incore detectors for determining the location of and correcting for any misaligned rod members, and for generating on-line real time signals representative of the local power density at any selected point within the reactor core.

25. The apparatus of claim 24 wherein said detector strings are arranged in a number of channel sets distributed across the reactor core in selected fuel assemblies in a pattern such that the movement of any rod member produces a uniquely identifiable change in the response signal generated by the fixed incore detectors even with one channel set out of service, and including signal processing means for each channel set and means for transmitting the response signals associated with each signal processing means to each of the other signal processing means such that each signal processing means generates on-line real time signals representative of the power density at any selected point in the reactor core.

26. The method of claim 1 wherein the reactor core comprises a number of fuel assemblies and wherein the step of determining the location of any misaligned rods comprises:

distributing a plurality of nuclear detectors fewer in number than the number of fuel assemblies throughout the reactor core in selected fuel assemblies in a pattern such that movement of each rod affects the response of at least one detector in a uniquely identifiable response pattern;

storing a set of pattern recognition signals representative of a fractional effect of the misalignment of a rod on any detector located in a predetermine number of fuel assemblies around the location of said rod for each unique location of a rod;

generating for each detector location, a fractional deviation signal representative of the fractional difference between the actual detector response and an expected response based upon changes in rod positions from reference conditions as indicated by the rod position indicating means;

selecting the detector having the largest deviation signal;

performing successively for each rod within a preset distance of said selected detector, the following steps:

selecting from said stored set of pattern recognition signals the set applicable to the location of the rod; and generating an error signal representative of the correlation of the selected pattern recognition fractional effect signals to the fractional deviation signals for all detectors located within said predetermined number of fuel assemblies from the rod location;

comparing said errors and selecting the rod for which the smallest error is generated; and comparing said smallest error with a preset value and generating a signal identifying said selected rod as misaligned when said smallest error exceeds the preset value.

27. The method of claim 3 including the step of summing all of said local power signals to generate a total core power signal.

28. The method of claim 11 including the additional steps of:

determining whether the misalignment of a rod identified as misaligned was a withdrawal; and blocking withdrawal of the other rods if the misalignment was not a withdrawal.

* * * * *